United States Patent
Oikawa

(10) Patent No.: US 8,515,237 B2
(45) Date of Patent: Aug. 20, 2013

(54) IMAGING DEVICE AND IMAGE PROCESSING APPARATUS

(75) Inventor: Masafumi Oikawa, Mitaka (JP)

(73) Assignee: Nikon Corporation, Tokyo (JP)

( * ) Notice: Subject to any disclaimer, the term of this patent is extended or adjusted under 35 U.S.C. 154(b) by 252 days.

(21) Appl. No.: 12/897,195

(22) Filed: Oct. 4, 2010

(65) Prior Publication Data

US 2011/0116759 A1 May 19, 2011

(30) Foreign Application Priority Data

Oct. 13, 2009 (JP) ................................ 2009-236519
Sep. 14, 2010 (JP) ................................ 2010-205173

(51) Int. Cl.
*H04N 5/77* (2006.01)
(52) U.S. Cl.
USPC ................. 386/226; 386/E5.069; 348/231.99
(58) Field of Classification Search
USPC .......................................... 386/226, E05.069
See application file for complete search history.

(56) References Cited

U.S. PATENT DOCUMENTS

| | | | |
|---|---|---|---|
| 2002/0051081 A1 | 5/2002 | Hori et al. | |
| 2003/0002853 A1 | 1/2003 | Hori et al. | |
| 2003/0086692 A1 | 5/2003 | Hori et al. | |
| 2004/0252193 A1* | 12/2004 | Higgins | 348/149 |
| 2007/0174774 A1* | 7/2007 | Lerman et al. | 715/723 |

FOREIGN PATENT DOCUMENTS

| | | |
|---|---|---|
| JP | A-11-98455 | 4/1999 |
| JP | A-2002-125199 | 4/2002 |
| JP | A-2006-333038 | 12/2006 |
| JP | 2009060355 A * | 3/2009 |
| JP | A-2009-60355 | 3/2009 |
| JP | A-2009-089144 | 4/2009 |
| JP | B2-4277837 | 6/2009 |

OTHER PUBLICATIONS

Jan. 10, 2012 Japanese Office Action issued in Japanese Patent Application No. 2010-205173 (with translation).

* cited by examiner

*Primary Examiner* — Thai Tran
*Assistant Examiner* — Girumsew Wendmagegn
(74) *Attorney, Agent, or Firm* — Oliff & Berridge, PLC

(57) ABSTRACT

Provided are: an imaging sensor that captures light from a subject; a movement information detection unit that detects movement information of the subject; a time setting unit that sets at least one of a recording time for recording a zone movie image based on an imaging signal from the imaging sensor and a recording pause time for not recording the zone movie image, based upon the movement information of the subject detected by the movement information detection unit; and a movie image data creation unit that repeats recording of the zone movie image for the recording time and pausing of the recording of the zone movie image for the recording pause time based upon the setting made by the time setting unit, and creates movie image data including a movie image formed by successively joining a plurality of the repeatedly recorded zone movie images.

36 Claims, 17 Drawing Sheets

IMAGING DEVICE AND IMAGE PROCESSING APPARATUS

CROSS-REFERENCE TO RELATED APPLICATIONS

The disclosures of the following priority applications are herein incorporated by reference:

Japanese Patent Application No. 2009-236519, filed on Oct. 13, 2009; and

Japanese Patent Application No. 2010-205173, filed on Sep. 14, 2010.

TECHNICAL FIELD

The present invention relates to an imaging device capable of recording a movie image and to an image processing device capable of producing a movie image.

BACKGROUND ART

Imaging devices have been proposed, which have a function for sequentially recording a plurality of image data that are automatically shot at predetermined time intervals on a recording medium, in which the time required from shooting to recording on the recording medium is calculated for one image data from among the plurality of image data, a range for the predetermined time interval that can be selected is determined based upon the calculated time, and the user sets the predetermined time interval based upon the determination results (for example, see Patent Literature 1).

CITATION LIST

Patent Literature

{PTL1} Japanese Patent No. 4277837

SUMMARY OF INVENTION

Technical Problem

However, with the conventional technology described above, when automatically shooting movie images at predetermined time intervals, it is not possible to set a time interval for the purpose of obtaining an effective and impressive movie image in keeping with the movement of the subject.

It is to be noted that, when shooting a movie image, there is a demand for technology that allows for simple acquisition of a movie image having an impressive video effect, such as a movie image in which a continuously moving subject is changed so as to be discontinuously moving. However, a high level of operational skill is required when a user attempts to shoot a movie image having an impressive video effect such as described above by way of manually operating a video camera or the like.

An object of the present invention is to provide an imaging device and an image processing device capable of easily creating movie image data including a movie image having an impressive video effect.

Solution to Problem

An imaging device of the present invention comprises: an imaging sensor that captures light from a subject; a movement information detection unit that detects movement information of the subject; a time setting unit that sets at least one of a recording time for recording a zone movie image based upon an imaging signal from the imaging sensor and a recording pause time for not recording the zone movie image, based on the movement information of the subject detected by the movement information detection unit; and a movie image data creation unit that repeats recording of the zone movie image for the recording time and pausing of the recording of the zone movie image for the recording pause time based upon the setting made by the time setting unit, and creates movie image data including a movie image formed by successively joining a plurality of the repeatedly recorded zone movie images.

Moreover, an image processing device of the present invention comprises: a movement information detection unit that detects movement information for a subject in a movie image based upon movie image data recorded on a recording medium; a time setting unit that sets at least one of a display time in which a zone movie image, formed from at least one frame image from among a plurality of frame images that form the movie image, is displayed on a display unit, and a non-display time in which the zone movie image is not displayed on the display unit, based upon the movement information of the subject detected by the movement information detection unit; and a display control unit that joins and displays on the display unit a plurality of the zone movie images corresponding to the display time, in the temporal sequence in which the zone movie images are recorded, based upon a setting made by the time setting unit.

Advantageous Effects of Invention

According to the imaging device and the image processing device of the present invention, it is possible to easily create movie image data including a movie image having an impressive video effect.

DESCRIPTION OF EMBODIMENTS

Hereinafter, with reference to the drawings, an electronic camera will be described as an imaging device according to a first embodiment of the present invention. It is to be noted that the electronic camera according to this embodiment is an interchangeable lens type electronic camera, and is described as having a mounted photographic lens (not shown), but this may also be an electronic camera having an integrated lens. Further, in this embodiment, an electronic camera capable of shooting a still image and a movie image is given as an example, but this may also be an electronic camera that is only capable of shooting a movie image.

Figure 1:
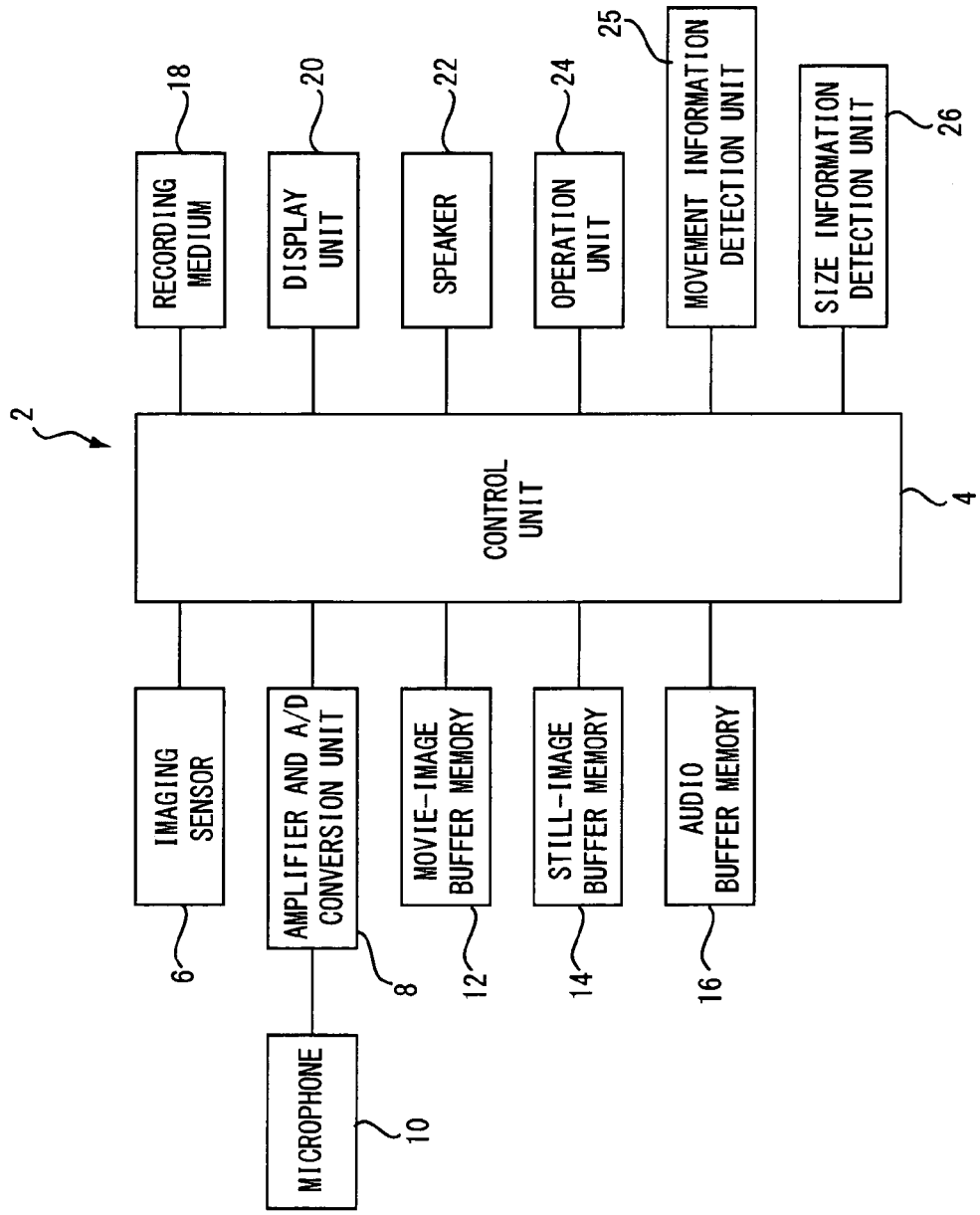
FIG. 1 is a block diagram showing the system configuration of an electronic camera according to an embodiment.

FIG. 1 is a block diagram showing the system configuration of an electronic camera 2 according to the first embodiment. As shown in FIG. 1, the electronic camera 2 includes a control unit 4, which is constituted with a microprocessor or the like, for performing unified control of the various parts of the electronic camera 2. AF (autofocus) pixels are embedded within a part of an imaging sensor 6, described hereafter, in the manner set forth, for example, in Japanese Patent Laid-open Publication (A) No. 2009-89144, and the control unit 4 performs autofocus by way of a divided-pupil phase difference detection system using these AF pixels. Specifically, a focus position is adjusted by moving a focus lens (not shown) in the optical axis direction via a lens drive unit (not shown).

The control unit 4 is connected to the imaging sensor 6, an amplifier and A/D conversion unit 8, a movie-image buffer memory 12, a still-image buffer memory 14, an audio buffer memory 16, a recording medium 18, a display unit 20, a speaker 22, an operation unit 24, a movement information detection unit 25, and a size information detection unit 26. The imaging sensor 6 is constituted with a CCD, a CMOS or the like and captures light from a subject via a photographic lens (not shown), so as to output an imaging signal to the control unit 4. The amplifier and A/D conversion unit 8 converts an analog signal of the audio in the vicinity of the electronic camera 2, which is collected by a microphone 10 into a digital signal, and outputs the converted digital audio signal to the control unit 4.

The movie-image buffer memory 12 temporarily stores movie image data created based upon the imaging signal from the imaging sensor 6 and resized (resolution reduced) to a resolution for movie image use, via a compression circuit (not shown) in the control unit 4. The still-image buffer memory 14 temporarily stores still image data created based upon the imaging signal from the imaging sensor 6. The audio buffer memory 16 temporarily stores audio data created based upon the digital audio signal output from the amplifier and A/D conversion unit 8.

The recording medium 18 is a portable recording medium detachably provided in a card slot (not shown) arranged to the electronic camera 2, and for example, uses a CF card, an SD card, a smart media or the like. The recording medium 18 records movie image data, resulting from movie image data created in the control unit 4 undergoing image processing for a movie image by a movie-image signal processing circuit (not shown) in the control unit 4, and undergoing movie image compression processing by a movie image compression circuit (not shown) in the control unit 4. Likewise, the recording medium 18 records still image data, resulting from the still image data created in the control unit 4 undergoing still-image compression processing by a still-image signal processing circuit (not shown) in the control unit 4, as well as audio data created in the control unit 4 and added to the corresponding movie image data, and the like.

The display unit 20 is constituted with a monitor or an EVF, for example, configured by an LCD, for example, provided on the rear surface of the electronic camera 2. The display unit 20 displays a through image based upon the imaging signal from the imaging sensor 6, a still image and a movie image based upon the image data recorded on the recording medium 18, a sample movie image stored in a memory (not shown) in a camera as sample movie image data for each scenario movie image shooting mode which will be described later, information regarding shooting, and the like. The speaker 22 outputs audio based upon the audio data recorded on the recording medium 18, or based upon audio data recorded in a memory (not shown) in association with the sample movie image data stored in the memory (not shown) in the above-described camera.

The operation unit 24 includes a power switch for turning on/off the power of the electronic camera 2, a recording start button (for example, a REC button, a shutter button and the like) operated when starting to record a still image, a movie image and audio, a recording end button (for example, a REC button, a shutter button and the like) operated when completing recording the movie image and audio, a menu button for displaying a menu and the like on the display unit 20, a cross key operated at the time of the selection of menu items and the like and at the time of various settings, and an OK button for performing a determination operation for the selection of the menu items and the like and the various settings.

The movement information detection unit 25 detects movement information for a subject having movement, when a movie image is shot by the electronic camera 2. Specifically, movement information for a subject, which is detected by an autofocus function, of the divided-pupil phase difference detection system, with which the electronic camera 2 is provided, is obtained from the control unit 4, and the movement information obtained is temporarily stored. Then, the movement velocity of the subject is calculated based upon the distance to the subject, which is obtained from the movement information of the subject, and the time.

The size information detection unit 26 detects information on the size of a principal subject having movement, with respect to the shooting screen, when a movie image is shot by the electronic camera 2. Specifically, templates for principal subjects are created in advance, and the templates that have been created are stored in a memory (not shown) or the like. Then, when the movie image is shot, the principal subject is identified based upon the templates that are stored in the memory or the like and, using well-known image processing techniques such as calculating the number of pixels in the principal subject with respect to the number of pixels in the overall shooting screen, the size of the principal subject with respect to the shooting screen is detected.

Figure 2:
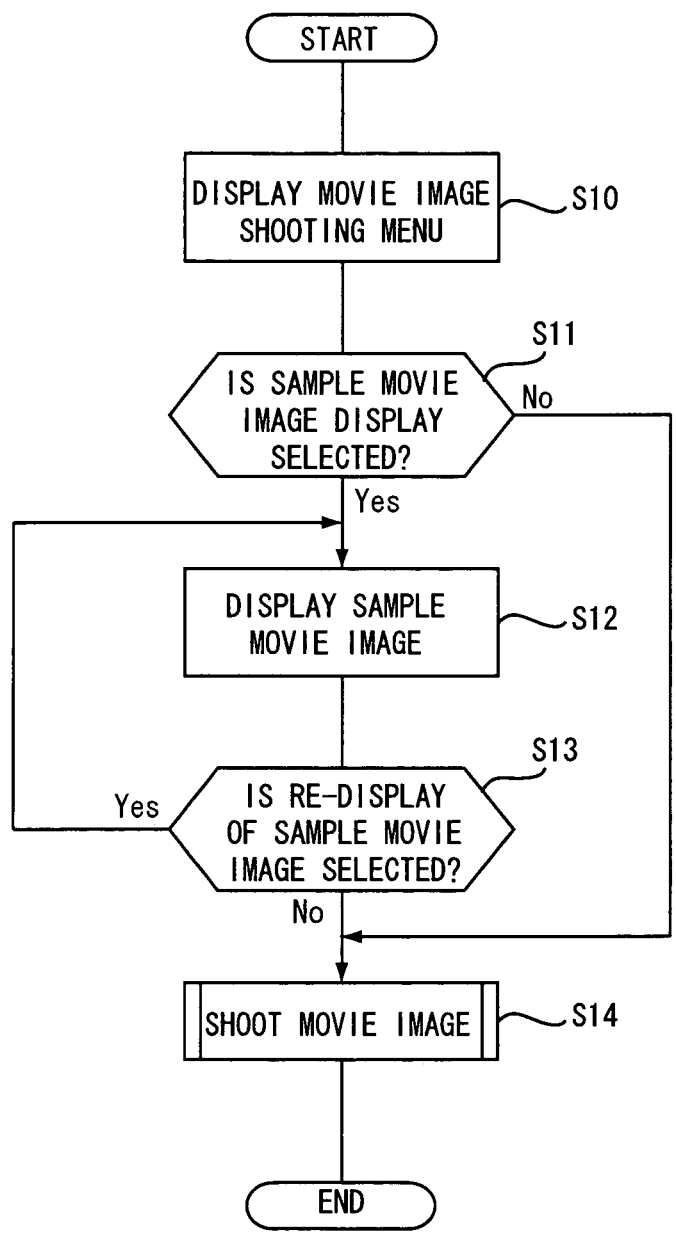
FIG. 2 is a flowchart explaining processing when shooting a movie image in the electronic camera according to the embodiment.

In the electronic camera 2 according to this embodiment, by repeating the recording of a movie image and the pausing of recording multiple times, it is possible to automatically shoot a movie image in which a continuously moving subject is reproduced as moving discontinuously. Hereafter, with reference to the flowchart shown in FIG. 2, description is given of the processing when the above-described movie image shooting is performed with the electronic camera 2 according to the first embodiment.

Figure 3:
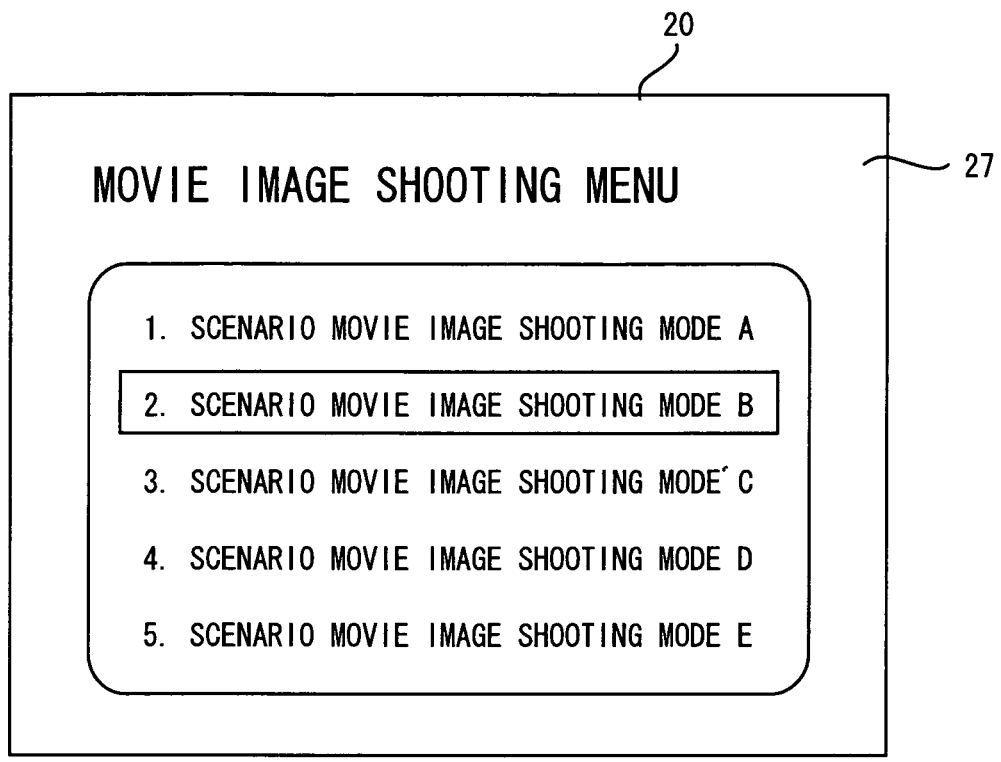
FIG. 3 is a diagram showing a display example of a display unit according to the embodiment.
Figure 4:
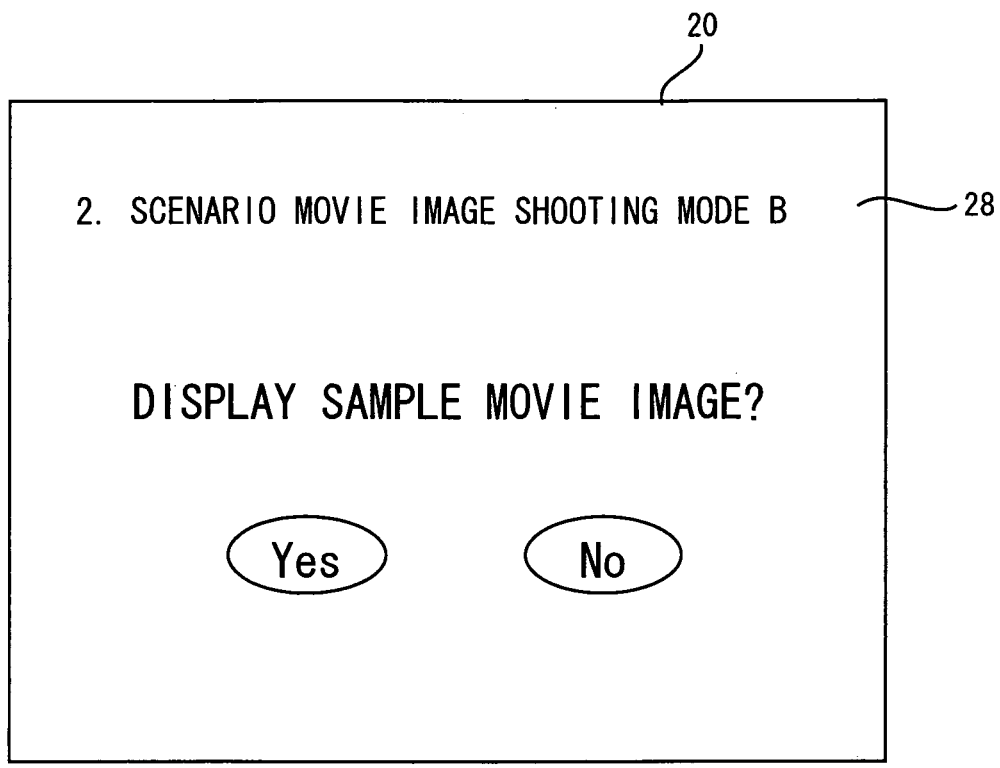
FIG. 4 is a diagram showing a display example of the display unit according to the embodiment.

First, if a user gives an instruction for displaying a movie image shooting menu (e.g., pressing of a menu button), the control unit 4 displays a movie image shooting menu screen 27, for example as shown in FIG. 3, on the display unit 20 (step S10). Items that allow for selecting various movie image shooting modes (in FIG. 3, scenario movie image shooting modes A, B, C, D, and E) are displayed on the movie image shooting menu screen 27. If the user selects one movie image shooting mode (in FIG. 3, the scenario movie image shooting mode B) using the cross key or the like and presses the OK button, the control unit 4 displays the screen 28, for example as shown in FIG. 4, on the display unit 20. A message such as "Display sample movie image?" and items serving to select an answer to the message (in FIG. 4, "Yes" and "No") are displayed on the screen 28.

It is to be noted that in this embodiment, the scenario movie image shooting mode B is a mode where a movie image is shot in which a moving subject will be reproduced as moving discontinuously. Further, the sample movie image is a movie image, which is created in advance for each scenario movie image shooting mode, which serve to accurately present to the user the characteristic video effect for each of these scenario movie image shooting modes, and which is stored in a memory (not shown) in the electronic camera 2. The user can easily understand the format (mode) of the movie image that can be shot with the selected scenario movie image shooting mode by way of viewing the sample movie image.

Figure 5:
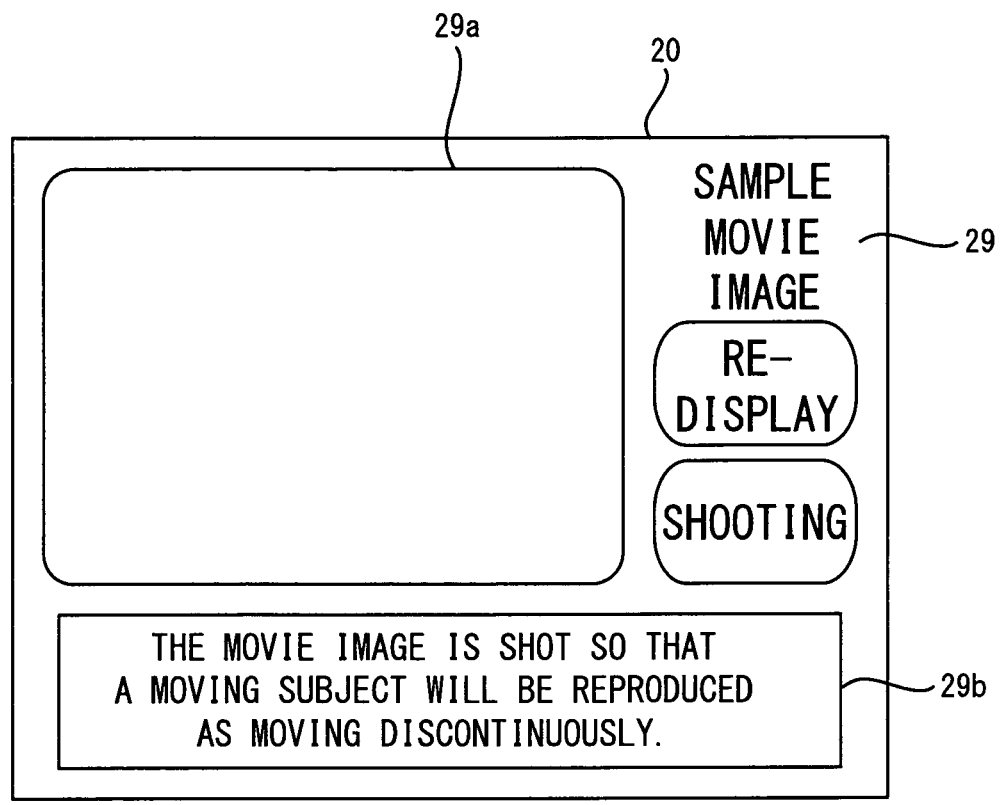
FIG. 5 is a diagram showing a display example of the display unit according to the embodiment.

If the user uses the cross key or the like to select "Yes" and presses the OK button (Yes in step S11), the control unit 10 displays a screen 29 on the display unit 20, for example as shown in FIG. 5, for the purpose of displaying the sample movie image (the display switches from FIG. 4 to FIG. 5). A sample movie image display area 29*a* for displaying the sample movie image, a message display area 29*b* in which simple' descriptive text (in FIG. 5, "The movie image is shot so that a moving subject will be reproduced as moving discontinuously.") is displayed in order to describe the selected scenario movie image shooting mode B, and icons for selecting displaying the sample movie image again or moving to movie image shooting (in FIG. 5, "Display Again" and "Shooting") are respectively displayed on the screen 29. Next, the control unit 4 displays a sample movie image in the scenario movie image shooting mode B in the sample movie image display area 29*a* (step S12).

It is to be noted that the scenario movie image shooting mode includes not only the mode for shooting a movie image in the manner set forth in the descriptive text in FIG. 5, but also movie image shooting modes (other scenario movie image shooting modes A and C through E) in which the movie image is reproduced and displayed according to scenarios different from each other in each mode and which provide various video effects, e.g., a mode for shooting a movie image while successively switching focus among subjects at different shooting distances within the shooting screen and a mode for shooting a movie image while simultaneously changing the focus state and the zoom state.

If the user selects "Display Again" using the cross key or the like, and presses the OK button (Yes in step S13), the control unit 4 once again displays the sample movie image corresponding to the scenario movie image shooting mode B in the sample movie image display area 29*a* on the screen 29 shown in FIG. 5 (step S12). Meanwhile, if the user selects "No" on the screen 28 shown in FIG. 4 (NO in step S11), or if the user selects "Shooting" on the screen 29 shown in FIG. 5 (NO in step S13), the control unit 4 moves to shooting the movie image in the scenario movie image shooting mode B, i.e., in which a moving subject will be reproduced as moving discontinuously (step S14).

Figure 6:
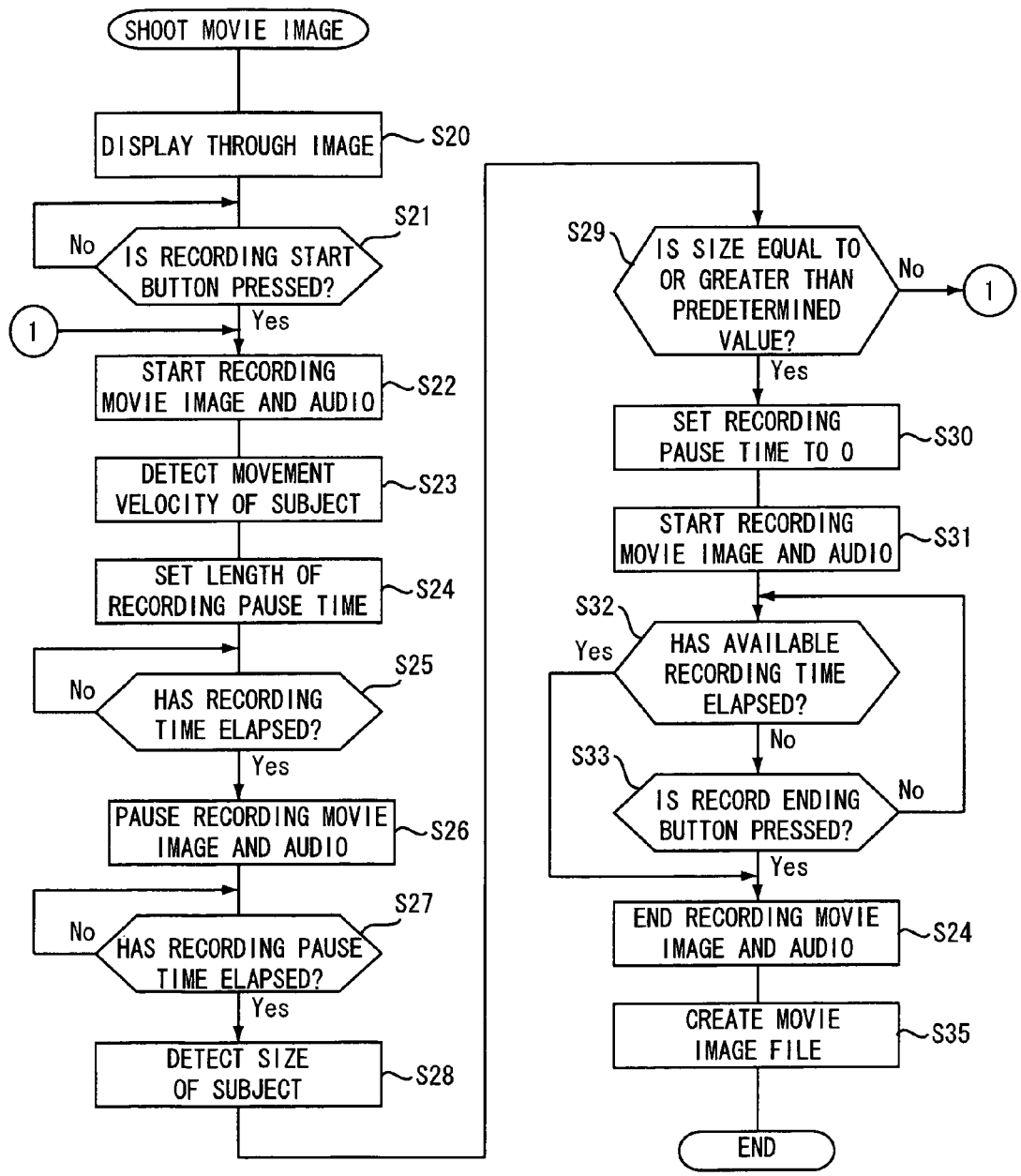
FIG. 6 is a flowchart explaining processing when shooting a movie image in the electronic camera according to a first embodiment.
Figure 7:
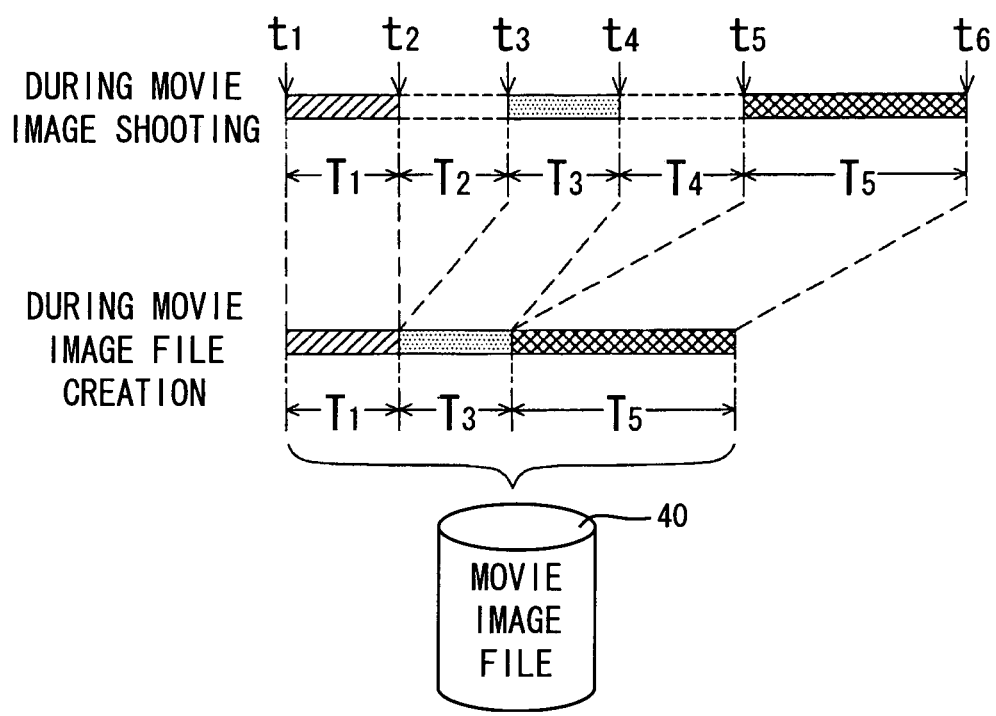
FIG. 7 is a diagram explaining shooting a movie image and creating a movie image file.

FIG. 6 is a flowchart explaining the processing when shooting a movie image in the scenario movie image shooting mode B, and FIG. 7 is a diagram explaining shooting the movie image in the scenario movie image shooting mode B and the creating a movie image file based upon the movie image that is shot.

Figure 8:
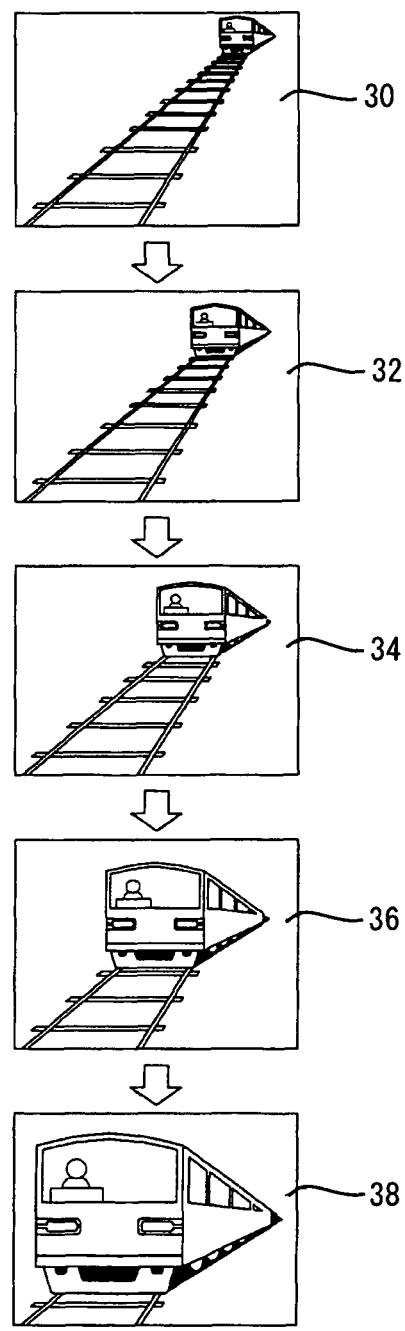
FIG. 8 is a diagram showing an example of a movie image to be shot.

First, the control unit 4 displays a through image on a display surface of the display unit 20 (step S20). Next, using the autofocus function, the focus position is moved according to the movement of the subject, so as to keep the subject in focus at all times. It is to be noted that in this embodiment, a movie image is shot in which a train approaches the electronic camera 2 from a distance, as shown in FIG. 8.

Then, the control unit 4 determines whether or not the user has pressed the recording start button (in this embodiment, the REC button) (step S21). If it is determined in step S21 that the recording start button has been pressed (Yes in step S21), the control unit 4 starts recording the movie image and the audio (step S22, time t1 in FIG. 7). It is to be noted that the frame image when the recording start button is pressed in step S21 (time t1) is an image 30 shown in FIG. 8. Here, the movie image and the audio started to be recorded as of the time t1 are recorded until a time t2, and become the first zone movie image and zone audio (the areas indicated by diagonal hatching in FIG. 7) in the movie image in the scenario movie image shooting mode B (a movie image in which recording and pausing of recording are repeated). Further, a recording time T1, in which the first zone movie image and zone audio are recorded, is set in advance and stored in a memory (not shown) or the like.

Next, the control unit 4 detects the movement velocity of the subject (step S23). Specifically, the control unit 4 uses the autofocus function so as to move the focus position according to the movement of the train so that the moving train (see FIG. 8) is kept in focus at all times, and outputs the focus position movement results to the movement information detection unit 25. The movement information detection unit 25 calculates the movement velocity of the train based upon the focus position movement results that are output from the control unit 4, and outputs the calculation result to the control unit 4.

Next, the control unit 4 sets the length of the first recording pause time (in FIG. 7, time T2), during which the movie image and the audio are not recorded, based upon the movement velocity of the subject (train) that is detected in step S23 (step S24). That is, the length of time between the first zone movie image and zone audio (the areas indicated by diagonal hatching in FIG. 7) and a second zone movie image and zone audio (the areas indicated by dots in FIG. 7) that is recorded from a time t3 to a time t4, which is described hereafter, is set.

Figure 9:
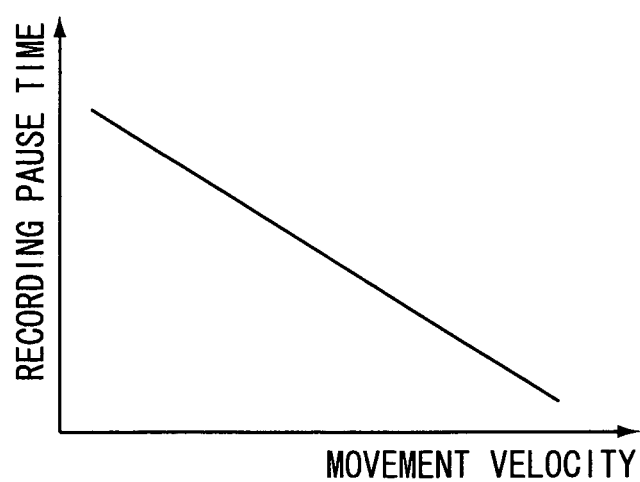
FIG. 9 is a graph showing a relation between a recording pause time and a movement velocity of a subject.

For example, the control unit 4 sets the lengths of recording pause times in advance for subject movement velocities, stores these in a table in a memory (not shown) in the camera or the like, and sets the length of the recording pause time by way of referencing this table. Specifically, as shown in the graph in FIG. 9, the recording pause time T2 is shortened as the subject movement velocity increases. That is, with a rapidly moving subject, even if the recording pause time T2 is short, the difference between the position of the subject at the time t2 and the position of the subject at the time t3 is visually apparent, and thus the characteristic video effect for the movie image in the scenario movie image shooting mode can be adequately expressed. Meanwhile, as shown in the graph in FIG. 9, the recording pause time T2 is lengthened as the movement velocity of the subject decreases. That is, with a slowly moving subject, by increasing the recording pause time T2, the difference between the position of the subject at the time t2 and the position of the subject at the time t3 is made apparent, and thus the characteristic video effect for the movie image in the scenario movie image shooting mode can be adequately expressed.

Next, the control unit 4 determines whether or not the recording time T1 has elapsed (step S25). As described above, the recording time T1 is the period of time in which the first zone movie image and the first zone audio (the areas indicated by diagonal hatching in FIG. 7) are recorded. If it is determined in step S25 that the recording time T1 has elapsed (Yes in step S25), the control unit 4 stops recording the movie image and the audio (step S26, time t2 in FIG. 7). That is, recording of the first zone movie image and zone audio (the areas indicated by diagonal hatching in FIG. 7) ends and recording of the movie image and the audio is paused from the time t2 to the time t3, which is to say, during the recording pause time T2 that is set in step S24. It is to be noted that the frame image when the recording time T1 has elapsed (time t2) is the image 32 shown in FIG. 8.

At this time, the control unit 4 performs control so that the frame images in the period from the time t1 until the time t2 (recording time T1), which are based upon the imaging signal from the imaging sensor 6, are resized to a resolution for movie image use and stored in the movie-image buffer memory 12, but while the imaging signal continues to be output from the imaging sensor 6 in the period from the time t2 to the time t3 (recording time T2) the frame images based upon this are not stored in the movie-image buffer memory 12.

Next, the control unit 4 determines whether or not the recording pause time T2, which is set in step S24, has elapsed (step S27). If it is determined in step 27 that the recording pause time T2 has elapsed (Yes in step S27), the control unit 4 detects the size of the subject (train) with respect to the shooting screen (step S28). Specifically, the control unit 4 resizes the resolution of the image (in FIG. 8, image 34) when the recording pause time T2 has elapsed (in FIG. 7, time t3) to a resolution for use in size information detection (reduction) and outputs this to the size information detection unit 26. The size information detection unit 26 identifies the train in the image 34 based upon a template (train template) that is stored in advance in a memory (not shown) or the like, calculates the number of pixels occupied by the train with respect to the number of pixels in the overall shooting screen, for example, and detects the size of the train with respect to the shooting screen based upon the calculation results. Then, the detection result is output to the control unit 4.

Next, the control unit 4 determines whether or not the size of the train with respect to the shooting screen that is detected in step S28 is greater than or equal to a predetermined value (step S29). The predetermined value is set in advance as, for example, the ratio occupied by the subject with respect to the shooting screen (the area of the subject, or the length in the longitudinal, crosswise or diagonal direction of the screen) being 50% or the like, and is stored in a memory (not shown) or the like. If it is determined in step S29 that the size of the train with respect to the shooting screen is not greater than or equal to the predetermined value (No in step S29), the control unit 4 returns to the processing in step S22 and restarts recording of the movie image and audio (step S22, time t3 in FIG. 7). It is to be noted that as described above, the frame image when the recording pause time T2 has elapsed (time t3) is the image 34 shown in FIG. 8.

That is, the second zone movie image and zone audio (the areas indicated by dots in FIG. 7), in the period from the time t3 to the time t4 (recording time T3), are recorded. The recording time T3 is set in advance at the same length as the recording time T1, and stored in a memory (not shown) or the like. Then, the control unit 4 once again detects the movement velocity of the train (step S23) and sets the length of the second recording pause time (in FIG. 7, time T4) in which the movie image and audio are not recorded based upon the movement velocity of the train that is detected in step S23 (step S24). If the train is moving at the same speed, the second recording pause time T4 is set to the same length as the first recording pause time T2, but if the train is not moving at the same speed (if it has accelerated or decelerated), the second recording pause time T4 is set at a different length than the first recording pause time T2 (shorter than T2, in the case of acceleration, and longer than T2, in the case of deceleration).

Next, the control unit 4 determines whether or not the recording time T3 has elapsed (step S25), and if it is determined that the recording time T3 has elapsed (Yes in step S25), the control unit 4 stops recording of the second zone movie image and zone audio (step S26, time t4 in FIG. 7). That is, the control unit 4 controls so that the frame images based upon the imaging signal from the imaging sensor 6 during the recording time T3 are resized to the resolution for movie image use and stored in the movie-image buffer memory 12, but the frame images based upon the imaging signal from the imaging sensor 6 during the recording time T4 are not stored in the movie-image buffer memory 12. It is to be noted that the frame image when the recording time T3 has elapsed (time t4) is the image 36 shown in FIG. 8.

Next, the control unit 4 determines whether or not the recording pause time. T4 that is set in step S24 has elapsed (step S27), and if it is determined that the recording pause time T4 has elapsed (Yes in step S27) the control unit 4 returns again to the processing in step S22, and starts recording the third zone movie image and zone audio (step S22, time t5 in FIG. 7). It is to be noted that the frame image when the recording pause time T4 has elapsed (time t5) is the image 38 shown in FIG. 8.

Thus, the control unit 4 repeats the processing in steps S22 to S29 until it determines that the size of the train with respect to the shooting screen is greater than or equal to the predetermined value in step S29 (Yes in step S29). That is, the recording of the movie image and the audio and the pausing of the recording are repeated.

Then, if it is determined in step S29 that the size of the train with respect to the shooting screen is greater than or equal to the predetermined value (Yes in step 29), the control unit 4 sets the recording pause time to 0 (step S30) and restarts recording of the movie image and the audio (step S31). That is, because the recording pause time is set to 0 in step S30, recording of the movie image and the audio continues, even if the recording time (the recording time T1, which is set in advance) elapses. It is to be noted that in FIG. 7, after performing the recording of the movie image and the audio and the pausing of the recording twice (in FIG. 7, time t5), the size of the train is greater than or equal to the predetermined value, so the recording pause time is set to 0 and recording of the movie image and the audio continues (the areas indicated by crosshatching in FIG. 7).

Next, the control unit 4 determines whether or not the available recording time has elapsed (step S32). The available recording time is the maximum time for recording one movie image with audio (a period of time that is determined in advance in the camera), which is set in advance based upon the capacity of the recording medium 18 or the like, and stored in a memory (not shown) or the like. When it is determined in step S32 that the available recording time has not elapsed (No in step S32), the control unit 4 determines whether or not the user has pressed the recording end button (in this embodiment, the REC button) (step S33). When it is determined in step S33 that the recording end button has not been pressed (No in step S33), the control unit 4 returns to the processing in step S32 and repeats the processing in steps S32 and S33.

Meanwhile, if it is determined in step S32 that the available recording time has elapsed (Yes in step S32), or if it is determined in step S33 that the recording end button has been pressed (Yes in step S33), the control unit 4 ends recording of the movie image and the audio (step S34, time t6 in FIG. 7), and creates a movie image file 40 based upon the movie image formed by successively joining the first zone movie image and zone audio (recording time T1), the second zone movie image and zone audio (recording time T3) and the last movie image and audio (recording time T5) as shown in FIG. 7 (step S35). Then, the control unit 4 records the movie image file 40 created in step S35 on the recording medium 18. It is to be noted that prior to the processing in step S35, a message confirming recording to the recording medium 18 such as "OK to record?" and selection options for selecting whether or not to record to the recording medium 18, such as "Yes/No" may be displayed.

Further, if the available recording time elapses while the processing in steps S22 to S29 is performed, or if the user has pressed the recording end button, the control unit 4 ends recording of the zone movie image and the zone audio, and moves to the processing in step S35.

When the movie image in the movie image file 40 is reproduced, the control unit 4 reads the movie image file 40 from the recording medium 18 and displays the movie image sequentially on the display surface of the display unit 20, starting from the first zone movie image (recording time T1). That is, the movie image of the train approaching, from image 30 to image 32 shown in FIG. 8 (first zone movie image), is reproduced first, a switch is made from image 32 to image 34, then the movie image of the train approaching from image 34 to image 36 (second zone movie image) is reproduced, a switch is made from image 36 to image 38, and the last movie image is reproduced during the time T5.

With the electronic camera 2 according to the first embodiment, shooting can be performed with the recording of the movie image and the pausing of the recording automatically repeated, whereby it is possible to easily create a movie image in which a continuously moving subject is reproduced as discontinuously moving, which is to say, a movie image having an impressive video effect. That is, a movie image can easily be created in which the train approaches more powerfully (with the sensation of speed) than would result from continuously shooting a movie image of a train or the like that approaches the electronic camera 2 from a distance. Further, the last zone movie image and zone audio are recorded continuously over the recording time T5, which is longer than the recording times T1 and T3, whereby it is possible to create a movie image that does not suddenly end, does not produce an unnatural feeling in the spectator, and leaves a strong impression in the final scene.

Next, with reference to the drawings, an electronic camera according to a second embodiment of the present invention will be described. It is to be noted that the configuration of the electronic camera according to the second embodiment is one wherein the size information detection unit 26 (see FIG. 1) is eliminated from the electronic camera 2 according to the first embodiment. Accordingly, in the electronic camera according to the second embodiment, description is made using identical reference numerals for the configurations that are identical to the configurations in the electronic camera 2 shown in FIG. 1.

With the electronic camera according to the second embodiment, as with the electronic camera 2 according to the first embodiment, by repeating the recording of the movie image and the pausing of the recording multiple times, it is possible to automatically shoot a movie image in which a continuously moving subject will be reproduced as moving discontinuously. In the second embodiment, after the control unit 4 has finished the processing insteps S10 to S13 shown in FIG. 2, as in the first embodiment, the control unit 4 performs the processing in steps S20 to S27 shown in FIG. 6 as the processing in step S14. Then, without performing the processing in step S28 shown in FIG. 6, instead of the processing in step S29, a determination is made as to whether or not the recording of the zone movie images and the zone audios and the pausing of the recording have been performed a predetermined number of times.

The predetermined number of times is set in advance as the number of times that the recording of the zone movie images and the zone audios and the pausing of the recording are repeated, and is stored in a memory (not shown) or the like. In this embodiment, the predetermined number of times is set to twice. Accordingly, if the control unit 4 determines that the recording of the zone movie image and the zone audio and the pausing of the recording are not performed twice (determines that performed only once), the control unit 4 returns to the processing in step S22 shown in FIG. 6, and repeats the processing in steps S22 to S27 until it is determined that the recording of the zone movie images and the zone audios and the pausing of the recording are performed twice.

Meanwhile, if it is determined that the recording of the zone movie images and the zone audios and the pausing of the recording are performed twice, the processing in steps S30 to S35 shown in FIG. 6 is performed. That is, at time t5, as shown in FIG. 7, it is determined that the recording of the zone movie images and the zone audios and the pausing of the recording are performed twice, and at time t6, it is determined that the available recording time has elapsed, or that the recording end button has been pressed (Yes in step S32 or step S33), so recording of the movie image and the audio is ended (step S34), and the movie image file 40 is created (step S35).

With the electronic camera according to the second embodiment, because the number of times that recording of the zone movie images and the zone audios and pausing of the recording are performed is set in advance, a movie image similar to that shot in the first embodiment can easily be shot, even though a size information detection unit 26 is not provided.

It is to be noted that in the first and second embodiments, the recording pause time is set based upon the movement velocity of the subject, but it is also possible to set the recording time based upon the movement velocity of the subject. In this case, for example, the control unit 4 sets the length of the recording time in advance for the movement velocity of the subject, stores these in a table in a memory (not shown) or the like, and sets the length of the recording time by way of referencing this table. Specifically, the recording time is shortened with a greater subject movement velocity. That is, with a rapidly moving subject, even if the recording time is shortened, it is possible to record the manner in which the subject is moving and, because the number of times that a switch is made between recording and pausing of recording can be increased as a result of decreasing the recording time, the characteristic video effect for the movie image in this scenario movie image shooting mode can be adequately expressed. Meanwhile, the recording time is lengthened with a lower subject movement velocity. That is, with a slowly moving subject, by increasing the length of the recording time, the number of times that a switch is made between recording and pausing of recording decreases, but the manner in which the subject is moving can be clearly recorded, and therefore the characteristic video effect for the movie image in the scenario movie image shooting mode can be adequately expressed.

Further, it is also possible to set both the recording time and the recording pause time based upon the subject movement velocity. In this case, the recording time and the recording pause time are shortened with greater subject movement velocities. That is, by switching between recording and pausing of recording at a rapid rate, the characteristic video effect is expressed in the movie image in this scenario movie image shooting mode. Meanwhile, the recording time and the recording pause time are lengthened with lower subject movement velocities. That is, by switching between recording and pausing of recording at a moderate rate, the characteristic video effect is expressed in the movie image in this scenario movie image shooting mode.

Further, when a movie image is shot of a subject moving from a distance towards the electronic camera 2, or from the vicinity of the electronic camera 2 to a distance therefrom, at least one of the recording time and the recording pause time can be set based upon the size of the subject with respect to the shooting screen, instead of the movement velocity of the subject. In this case, in the first embodiment, the size of the subject with respect to the shooting screen is detected by way of the size information detection unit 26. In the second embodiment, instead of the movement information detection unit 25, a size information detection unit is provided, which is constituted in the same manner as the size information detection unit 26, and the size of the subject with respect to the shooting screen is detected by way of this size information detection unit. Then, the control unit 4 shortens at least one of the recording time and the recording pause time in response to an increase in the extent to which the detected size of the subject increases or decreases with respect to the shooting screen, and lengthens at least one of the recording time and the recording pause time in response to a decrease in the extent to which the size of the subject increases or decreases with respect to the shooting screen.

Further, if a movie image is shot of a subject moving towards the electronic camera 2 from a distance or moving from the vicinity of the electronic camera 2 to a distance therefrom, at least one of the recording time and the recording pause time can be set based upon focal length information for a photographic lens (not shown) that guides light from the subject to the imaging sensor 6, instead of the movement velocity of the subject. In this case, the control unit 4 obtains the focal length information for the photographic lens at predetermined time intervals, while shooting the movie image. Then, at least one of the recording time and the recording pause time is shortened in response to an increase in the extent to which the focal length of the photographic lens shortens or lengthens based upon the focal length information for the photographic lens at each predetermined time interval, and at least one of the recording time and the recording pause time is lengthened in response to a decrease in the extent to which the focal length of the photographic lens shortens or lengthens, based upon the focal length information for the photographic lens at each predetermined time interval.

Next, with the electronic camera according to the first and the second embodiments, another method (variant) is described for creating a movie image file including a movie image in which a continuously moving subject is reproduced as moving discontinuously.

The control unit 4 stores the movie image and the audio from time t1 to the time t6, shown in FIG. 7, in the movie-image buffer memory 12 and the audio buffer memory 16. At the same time, movement information of the subject, including the movement velocity of the subject (train), which is detected by the movement information detection unit 25 from the time t1 to the time t6, as well as the time at that moment and the like is recorded in a memory (not shown) or the like. It is to be noted that with the electronic camera 2 according to the first embodiment, subject size information, including the size of the subject (train) with respect to the shooting screen, which is detected by the size information detection unit 26, from the time t1 to the time t6, as well as the time at that moment and the like, is also recorded in a memory (not shown) or the like.

After shooting the movie image (subsequent to the time t6 in FIG. 7), the control unit 4 sets at least one of the recording times T1 and T3 and one of the recording pause times T2 and T4, based upon the recorded movement information of the subject. With the electronic camera 2 according to the first embodiment, after shooting the movie image (in FIG. 7, subsequent to the time t6), the control unit 4 sets the time at which the recording pause time is set to 0 (in FIG. 7, time t5), which is to say, the number of times that recording and pausing of recording are repeated (predetermined number of times) based upon the recorded size information of the subject. With electronic camera according to the second embodiment, the predetermined number of times is set in advance as described above.

Then, only the zone movie image and the zone audio corresponding to the respective recording times T1, T3, and T5 that are set are read from the movie-image buffer memory 12 and the audio buffer memory 16 (the zone movie images and zone audios corresponding to the recording pause times T2 and T4 that are set are deleted without being read out) and the movie image file 40 is created on the basis thereof. In the first and second embodiments, after detecting the movement velocity of the subject, the recording of the zone movie images and the zone audios or the pausing of the recording is controlled based upon the detected movement velocity of the subject, but in this variant, the recording of the zone movie images and the zone audios or the pausing of the recording can be controlled based upon the recorded movement velocity of the subject, before and after the time at which the movement velocity of the subject is detected. Accordingly, it is possible to create a movie image having more immediacy.

Figure 10:
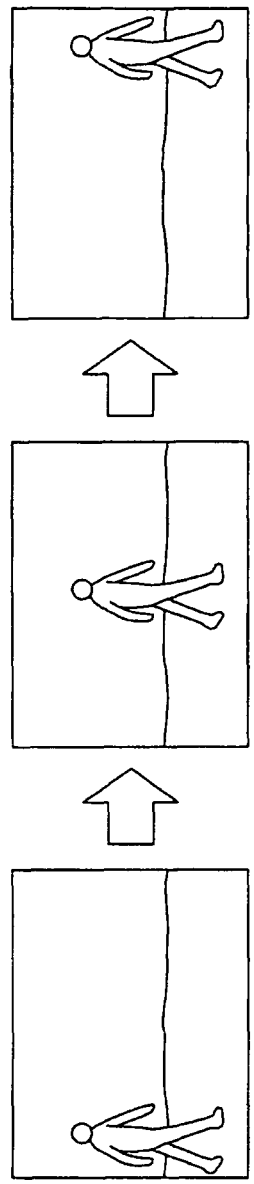
FIG. 10 is a diagram showing an example of a movie image to be shot.

It is to be noted that in the first and second embodiments, the movement velocity of the subject is detected using the autofocus function, but it is not possible to use the autofocus function to detect the movement velocity of a subject (a person in FIG. 10) that is moving crosswise (from left to right in FIG. 10) with respect to the shooting screen, for example, as shown in FIG. 10. In this case, instead of the movement information detection unit 26, a movement information detection unit is provided, which is capable of calculating a motion vector for the subject from a plurality of successively obtained shooting images, and the movement velocity of the subject is detected based upon the calculated motion vector. Specifically, the control unit 4 outputs, to the movement information detection unit, at least two frame images, which have been created based upon the imaging signal from the imaging sensor 6, and which have been resized to a resolution for use in subject movement information detection (a decrease in resolution). The movement information detection unit calculates a motion vector by way of well known motion vector calculation processing, based upon the at least two frame images, detects the movement velocity of the moving subject (a person in FIG. 10) based upon the calculated motion vector, and outputs the detection result to the control unit 4.

Next, with reference to the drawings, an electronic camera according to a third embodiment of the present invention will be described. It is to be noted that the constitution of the electronic camera according to the third embodiment is one in which the movement information detection unit 25 and the size information detection unit 26 (see FIG. 1) are eliminated from the electronic camera 2 according to the first embodiment. Accordingly, the electronic camera according to the third embodiment is described using identical reference numerals for configurations that are identical to the configurations in the electronic camera 2 shown in FIG. 1.

Figure 11:
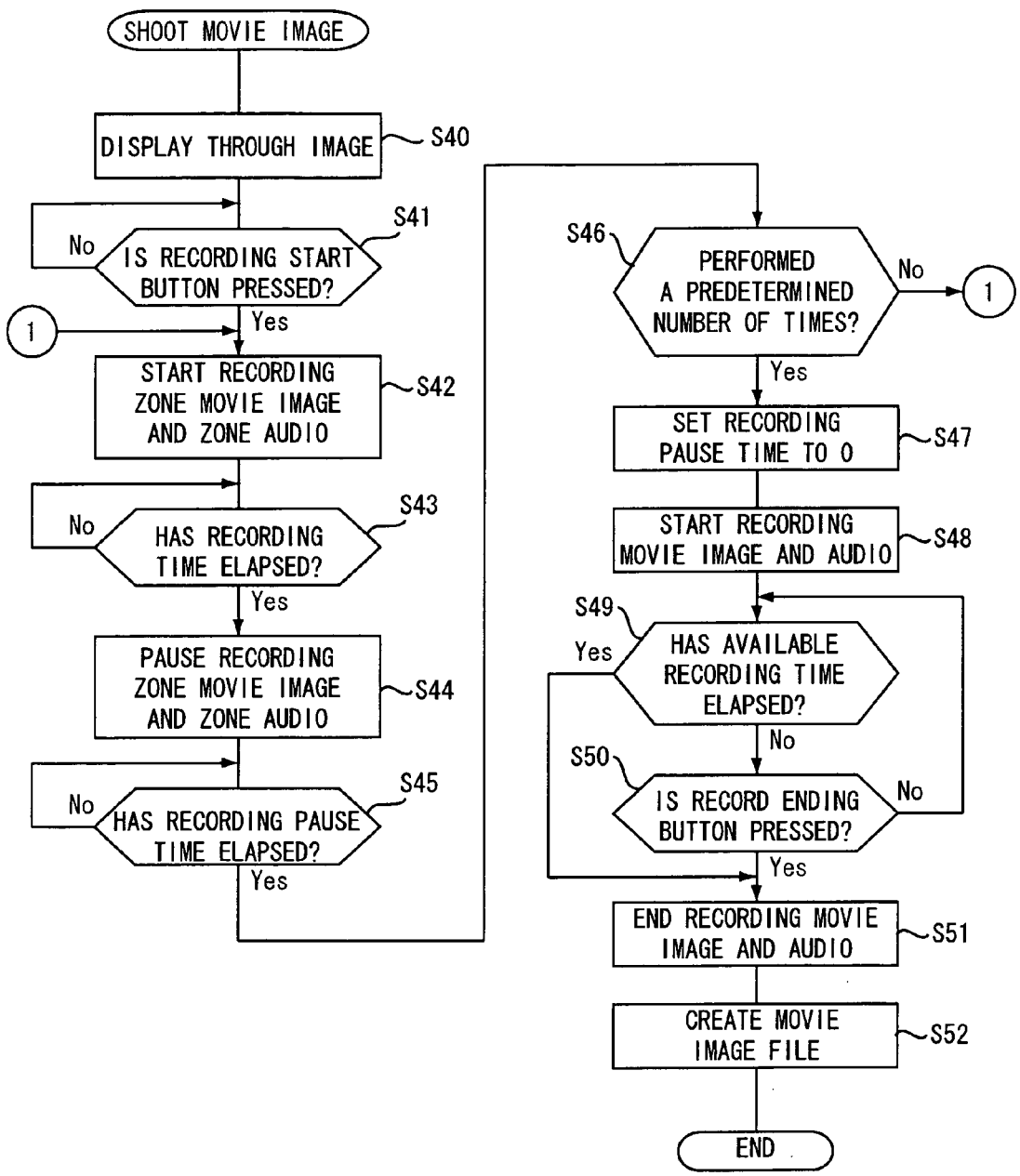
FIG. 11 is a flowchart explaining processing when shooting a movie image in an electronic camera according to a second embodiment.

With the electronic camera according to the third embodiment, as with the electronic camera 2 according to the first embodiment, by repeating the recording of the movie image and the pausing of the recording multiple times, it is possible to automatically shoot a movie image in which a continuously moving subject is reproduced as moving discontinuously. In the third embodiment, after the control unit 4 has finished the processing in steps S10 to S13 shown in FIG. 2, as in the first embodiment, the control unit 4 moves to the processing in step S14. FIG. 11 is a flowchart explaining the processing for shooting a movie image in the scenario movie image shooting mode B in the electronic camera according to the third embodiment. It is to be noted that the processing in steps S40 to S42 is the same as the processing in steps S20 to S22 shown in FIG. 6, and thus description thereof is omitted.

Next, the control unit 4 determines whether or not the recording time has elapsed (step S43). The recording time is the time in which the zone movie image and zone audio are recorded, and is set in advance and stored in a memory (not shown) or the like. If it is determined in step S43 that the recording time has elapsed (Yes in step S43), the control unit 4 stops recording of the first zone movie image and zone audio (step S44). Next, the control unit 4 determines whether or not the recording pause time has elapsed (step S45). The recording pause time is the time from the end of recording of the first zone movie image and zone audio until the start of recording of the second zone movie image and zone audio, and is set in advance and stored in a memory (not shown) or the like. During the recording pause time, the control unit 4 controls so that the frame images based upon the imaging signal from the imaging sensor 6 are not stored in the movie-image buffer memory 12.

If it is determined in step S45 that the recording pause time has elapsed (Yes, in step S45), the control unit 4 determines whether or not the recording of the zone movie image and the zone audio and the pausing of the recording are performed a predetermined number of times (step S46). The predetermined number of times is set in advance as the number of times that the recording of the zone movie image and the zone audio and the pausing of recording are repeated, and is stored in a memory (not shown) or the like. In this embodiment, the predetermined number of times is set to twice. Accordingly, if it is determined that the recording of the zone movie image and the zone audio and the pausing of the recording are not performed the predetermined number of times (if they are performed a number of times that is less than the predetermined number of times), the control unit 4 returns to the processing in step S42 and repeats the processing in steps S42 to S46 until it is determined that the recording of the zone movie image and the zone audio and the pausing of recording have been performed the predetermined number of times.

Meanwhile, if it is determined that the recording of the zone movie image and the zone audio and the pausing of the recording are performed twice (Yes in step 46), the control unit 4 moves to the processing in step S47. It is to be noted that the processing in steps S47 to S52 is the same as the processing in steps S30 to S35 shown in FIG. 6, and thus description thereof is omitted.

With the electronic camera according to the third embodiment, because the zone movie image and the zone audio recording time and recording pause time, as well as the number of times that zone movie image and zone audio recording and pausing are performed, are set in advance, a movie image can easily be shot, which is similar to that shot in the first embodiment, even if the movement information detection 25 and the size information detection unit 26 are not provided.

It is to be noted that in the third embodiment, the recording time, the recording pause time, and the predetermined number of times are set in advance, but the configuration may also be such that at least one of the recording time, recording pause time and predetermined number of times, which are set in advance, is treated as a default, and at least one of the recording time, recording pause time, and the predetermined number of times can be changed. In this case, an item for setting at least one of the recording time, the recording pause time, and the predetermined number of times is added to the menu items in the menu, and before shooting the movie image, a menu screen is displayed on the display unit 20, and at least one of the recording time, the recording pause time, and the predetermined number of times is set by way of operations using the cross key or the like.

Figure 12:
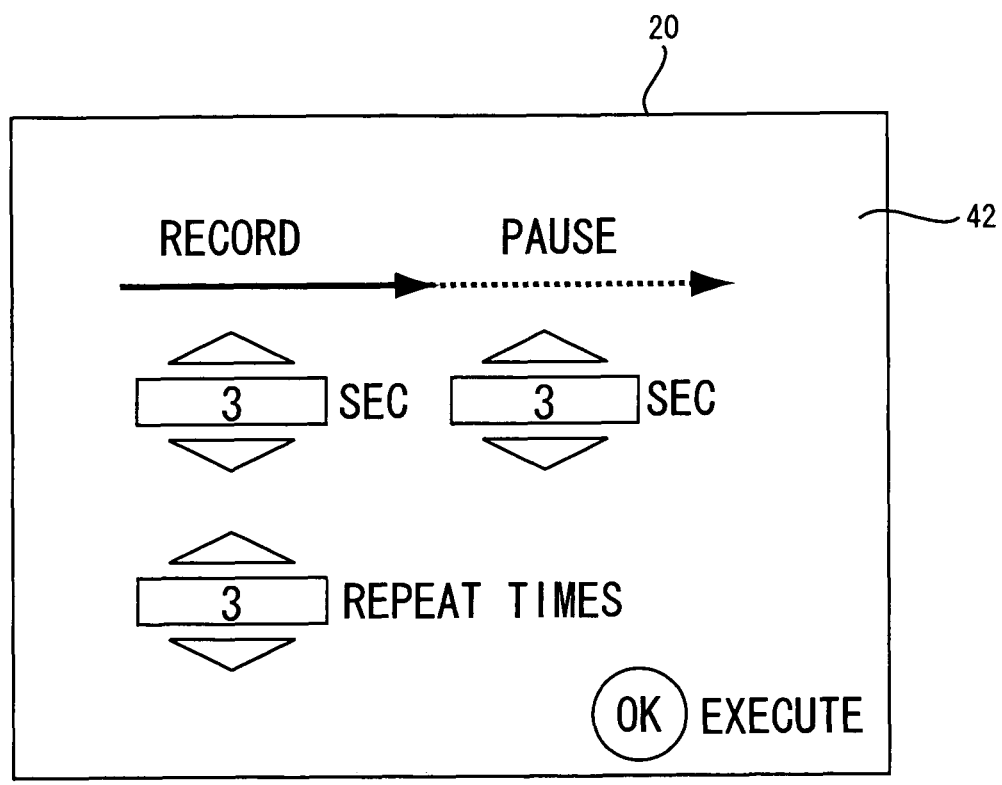
FIG. 12 is a diagram showing a display example of the display unit according to the second embodiment.

Further, prior to the processing in step S40 shown in FIG. 11, a settings screen 42 may be displayed on the display unit 20 for setting the recording time, the recording pause time and the predetermined number of times, as shown in FIG. 12. If the user uses the cross key or the like to set the recording time (in FIG. 12, 3 seconds), the recording pause time (in FIG. 12, 3 seconds) and the predetermined number of times (in FIG. 12, 3 times) on the settings screen 42 and presses the OK button, the control unit 4 displays, on the display unit 20, a message making it known that shooting of the movie image will start as a result of pressing the recording start button such as "Start shooting with the REC button" or the like, as well as the through image (step S40).

It is to be noted that the constitution may also be such that instead of using the cross key and the OK button, the electronic camera 2 includes: a touch panel I/F; and a touch panel connected to the touch panel I/F and provided on a display screen of the display unit 20, and the recording time, the recording pause time, and the predetermined number of times are set on the settings screen 42, using this touch panel. In this case, the control unit 4 performs recognition via the touch panel I/F, as a result of the touch panel (display screen of the display unit 20) being touched, for example, by the user's finger, a pen or the like, and performs processing based upon the recognition results.

Further, all of the movie images and audio (in FIG. 7, the movie images and audio from the time t1 to the time t6) may be stored in the movie-image buffer memory 12 and the audio buffer memory 16; the recording time, the recording pause time, the predetermined number of times and the like may be set after shooting the movie image (in FIG. 7, after the time t6); and the movie image file (for example, the movie image file 40 shown in FIG. 7) may be created based upon the settings.

Further, in the second and third embodiments described above, the number of times that recording of the zone movie image and the zone audio and pausing are performed is set in advance, but the constitution may be such that a time over which recording of the zone movie image and the zone audio and pausing are performed (predetermined time) is set in advance. In this case, instead of the control unit 4 determining whether or not recording of the zone movie image and the zone audio and pausing are performed the predetermined number of times, the control unit 4 determines whether or not recording of the zone movie image and the zone audio and pausing are performed for the predetermined time.

It is to be noted that if at least one of the recording time, the recording pause time and the predetermined number of times (predetermined time) is set manually as described above, the constitution may be such that control is performed so that the user cannot set the time or the number of times outside of an allowed setting range (for example, a recording time or a recording pause time that is longer than the available recording time, or the time resulting from multiplying the recording time by the predetermined number of times, or the like).

Further, the constitutions in each of the above-described embodiments are not such that setting is performed for the recording time T5 in which the final zone movie image and zone audio shown in FIG. 7 are recorded (a period of time longer than the recording times T1 and T3), but the constitution may be such that the recording time T5 is set in advance. In this case, the recording of the zone movie images and the zone audios and the pausing of the recording are repeated in the time period that results from subtracting the recording time T5 from the available recording time (in FIG. 7, from the time t1 to the time t5), and when the time t5 is reached, the recording pause time is set to 0, and recording of the final zone movie image and zone audio starts.

Figure 13:
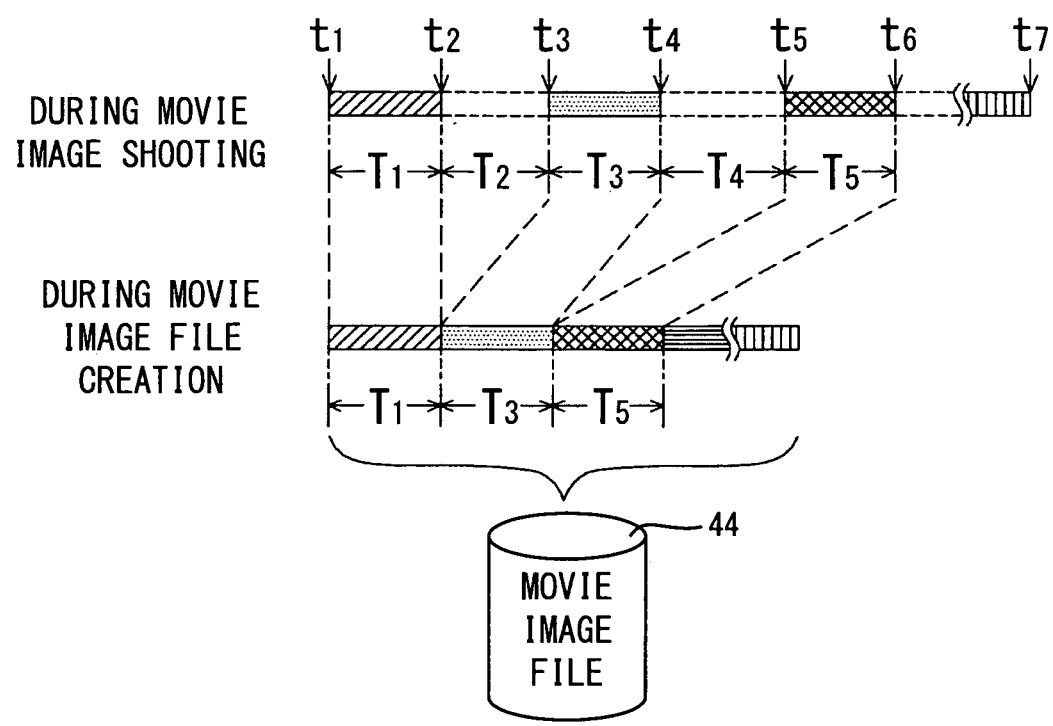
FIG. 13 is a diagram explaining shooting a movie image and creating a movie image file.
Figure 14:
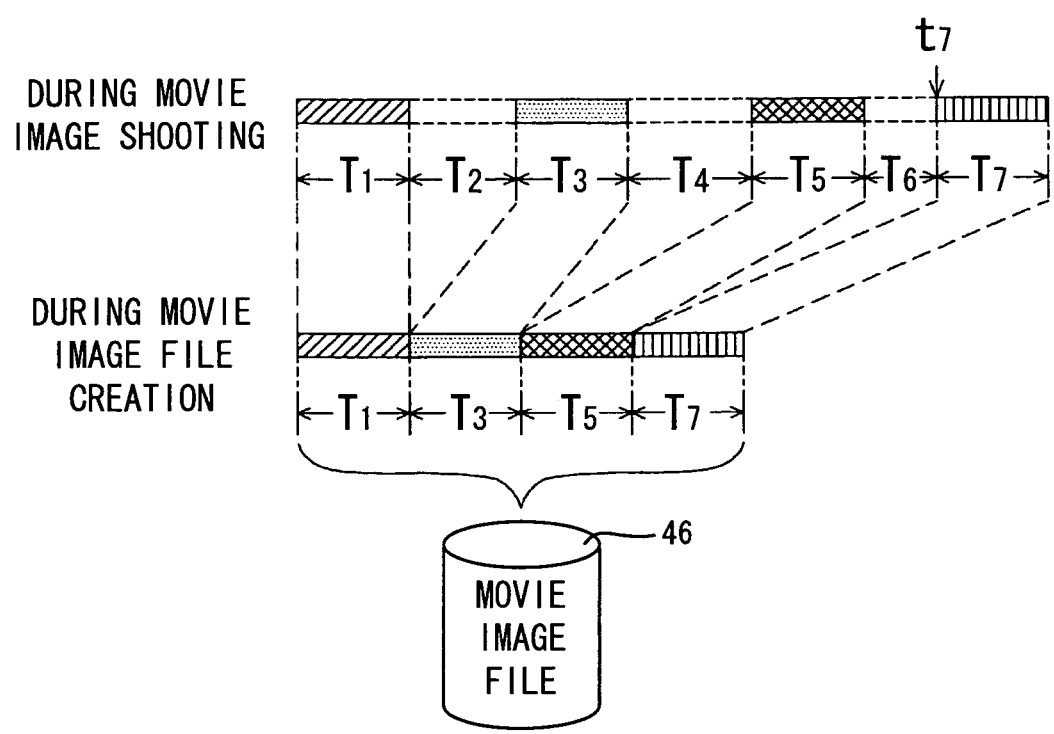
FIG. 14 is a diagram explaining shooting a movie image and creating a movie image file.

It is to be noted that in each of the above-described embodiments, as shown in FIG. 7, after repeating the recording of the zone movie images and the zone audios and the pausing of the recording a predetermined number of times, recording of the final zone movie image and zone audio is continued for a predetermined period of time that is longer than the recording time, and the movie image file 40 is created, in which the plurality of recorded zone movie images and zone audios are joined. However, the constitution may also be such that, as shown in FIG. 13, recording of the zone movie images and zone audios (in FIG. 13, T1, T3, T5, . . . ) and the pausing of the recording (in FIG. 13, T2, T4, . . . ) are repeated until the available recording time has elapsed, or until the recording end button is pressed (in FIG. 13, time t7), and a movie image file 44 is created, in which the plurality of recorded zone movie images and zone audios are joined. In this case, if, for example as shown in FIG. 14, the available recording time elapses, or the recording end button is pressed (in FIG. 14, time t7) during a recording pause time (in FIG. 14, T6), a final zone movie image and zone audio may be recorded (in FIG. 14, T7), and a movie image file 46 may be created, in which the plurality of recorded zone movie images and zone audios are joined.

Figure 15:
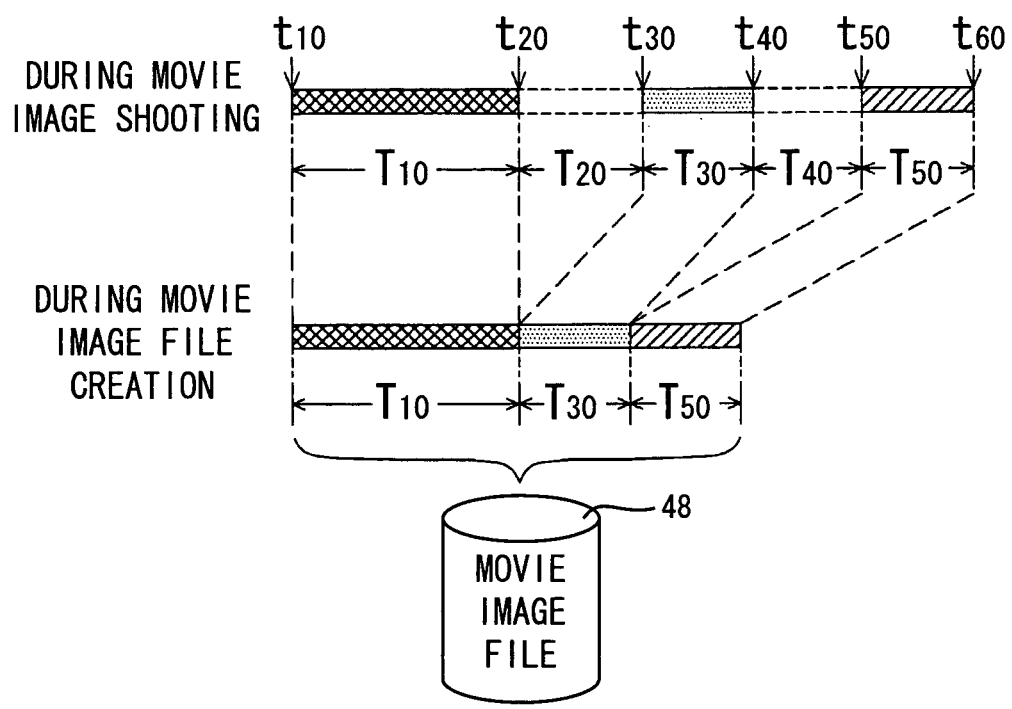
FIG. 15 is a diagram explaining shooting a movie image and creating a movie image file.

Further, the constitution may also be such that, as shown in FIG. 15, first, an initial zone movie image and zone audio are continuously recorded in a time T10 (the period between a time t10 and a time t20), which is longer than recording times T30 and T50, which have been set in advance, thereafter, recording of the zone movie image and the zone audio is paused in a recording pause time T20 (the period between the time t20 and a time t30), and recording of the zone movie image and zone audio in the recording time T30 (the period between the time t30 and a time t40) and so on, pausing of recording (time T40 (the period between the time t40 and a time t50) and so on) and recording (recording time T50 (the period between the time t50 and a time t60) and so on) are repeated, and a movie image file 48 is created, in which the plurality of recorded zone movie images and zone audios are joined.

Further, in each of the above-described embodiments, the available recording time is set in advance and recording for a period of time longer than the available recording time is not allowed, but the constitution may also be such that the movie image recording according to the present invention continues until the recording end button is pressed by the user. Further, the constitution may also be such that an available recording time that is set in advance is used as a default, and it is possible to change the available recording time.

Further, in each of the above-described embodiments, in terms of the focus position detection method (autofocus function), description is made using the example of an electronic camera that uses an imaging sensor in which AF pixels are embedded, and which is provided with an autofocus function based upon a phase difference detection method, but the present invention is not limited to this. For example, the present invention can also be applied to an electronic camera provided with an autofocus function based upon a phase difference detection method, in which a well known AF sensor is provided separately from the imaging sensor, specifically, an electronic camera constituted such that light from a subject is conducted to the AF sensor and the imaging sensor via a half mirror (this half mirror guides transmitted light to the imaging sensor and reflected light to the AF sensor). Further, the present invention can also be applied, for example, to an electronic camera provided with an imaging sensor, which is provided with an autofocus function based upon a contrast detection method.

Further, in each of the above-described embodiments, audio corresponding to the movie image is recorded, but it is also possible to record only the movie image, without recording the audio.

Alternatively, when shooting and recording the movie image, rather than recording the actual audio from the shooting scene (the audio corresponding to the movie image) while shooting, as in the manner of each of the above-described embodiments, operations may be performed so as to record only the zone movie images while shooting, and when creating the movie image files 40, 44, 46, and 48 immediately after shooting, together with joining the plurality of zone movie images, arbitrary music or audio (music or audio that has been stored in a memory within the camera in advance, which is selected by way of user selection or automatic selection by the camera) can be correlated therewith and recorded in the movie image files 40, 44, 46, and 48. It is to be noted that if music or audio is recorded, it is not necessary for this to be discontinuous music (or audio) matching the discontinuous movie image in which the zone movie images are joined, but rather it is preferable that the movie image files 40, 44, 46, and 48 be produced with uninterrupted music (continuous music). In addition, if the music (or audio) suddenly ends just before the end of the movie image, an unnatural impression will be produced, and thus it is preferable to record the music (or audio) so that it fades out, matching the ending of the movie image. Further, in some cases, it is preferable to record music (or audio) so that it fades in, matching the beginning of the movie image.

Next, with reference to the drawings, an electronic camera will be described as an image processing device according to a fourth embodiment of the present invention. It is to be noted that the electronic camera according to the fourth embodiment has the same constitution as the electronic camera 2 according to the first embodiment, and thus a description thereof will be omitted. Further, the functions and operations of the electronic camera according to the fourth embodiment will be described using identical reference numerals for the configurations that are identical to the configurations in the electronic camera 2 shown in FIG. 1.

In the fourth embodiment, when a scenario movie image (described hereafter) is created based upon a movie image file that is recorded on the recording medium 18, the control unit 4 temporarily stores the movie image data in the movie image file that is recorded on the recording medium 18 in the movie-image buffer memory 12, and temporarily stores the audio data in the movie image file that is recorded on the recording medium 18 in the audio buffer memory 16.

Further, when the scenario movie image is created based upon the movie image file that is recorded on the recording medium 18 in the electronic camera 2, the movement information detection unit 25 detects the movement information for a subject having movement in the movie image based upon the movie image data in the movie image file, and outputs the detection result to the control unit 4. Specifically, first, at least two frame images from among a plurality of frame images that form the movie image data in the movie image file are resized (the resolution is decreased) to a resolution for use in subject movement information detection, by way of a compression circuit (not shown) in the control unit 4. Then, a motion vector is calculated from the resized at least two frame images, by way of a well-known motion vector calculation processing, and the movement information of the subject having movement (in this embodiment, the movement velocity of the subject) is detected based upon the calculated motion vector.

Further, when the scenario movie image is created based upon the movie image file that is recorded on the recording medium 18 in the electronic camera 2, the size information detection unit 26 detects the size information for a principal subject having movement in the movie image based upon the movie image file, and outputs the detection result to the control unit 4. Specifically, first, a principal subject is identified based upon a principal subject template that is stored in a memory (not shown) or the like and, using well-known image processing techniques such as calculating the number of pixels in the principal subject with respect to the number of pixels in the overall frame image, the size of the principal subject with respect to the overall frame image is detected.

Figure 16:
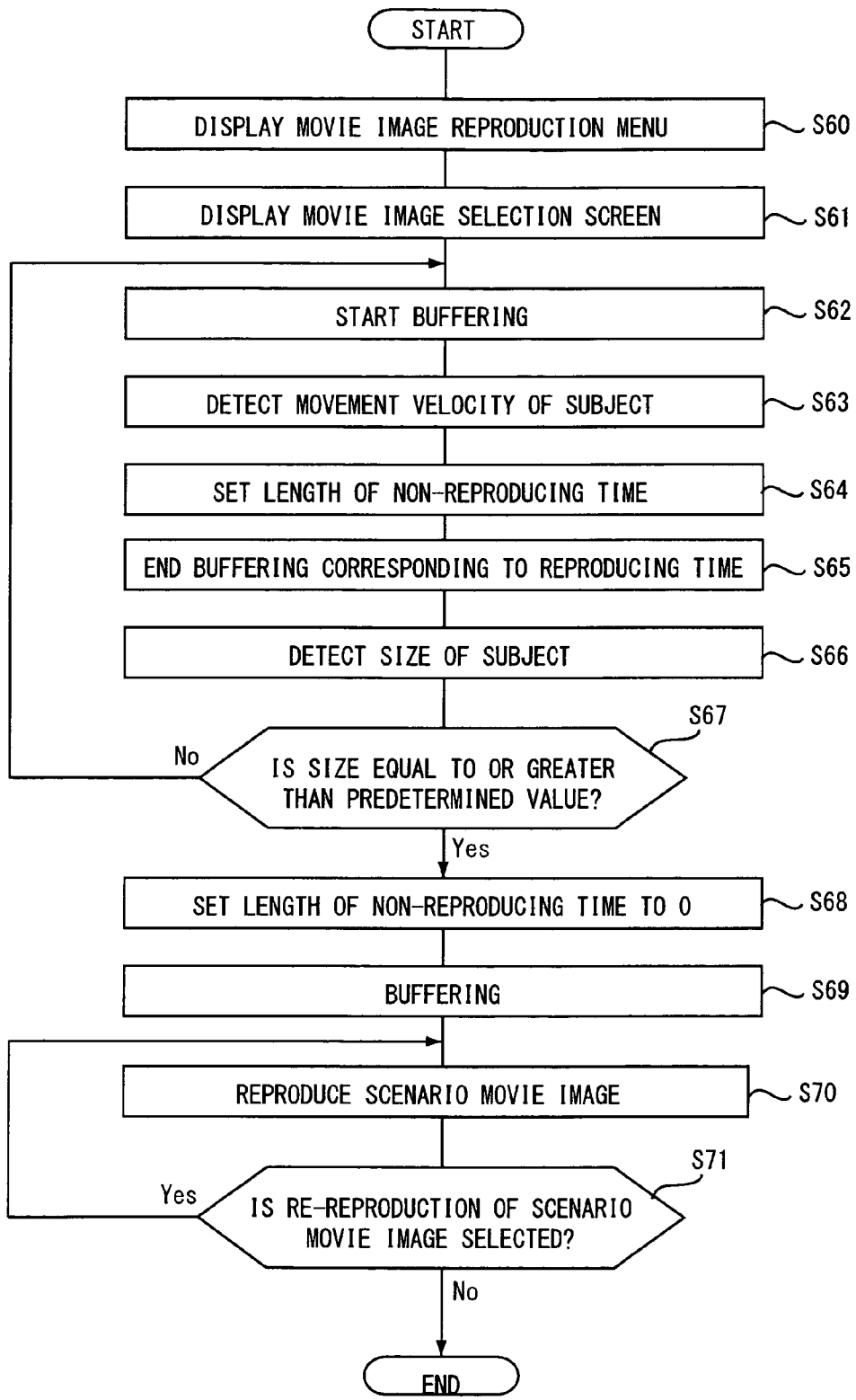
FIG. 16 is a flowchart explaining processing when creating and reproducing a scenario movie image in an electronic camera according to a fourth embodiment.

With the electronic camera 2 according to this embodiment, based upon a movie image file including a movie image and audio, which are shot by the electronic camera 2 and recorded on the recording medium 18, a scenario movie image can be automatically created in which a continuously moving subject is reproduced as discontinuously moving, and the scenario movie image that has been created can be reproduced. Hereafter, a description is given of the processing when the above-described scenario movie image is reproduced by the digital camera 2 according to the fourth embodiment. FIG. 16 is a flowchart explaining the processing for creating and reproducing the scenario movie image described above, and FIG. 17 is a diagram explaining the processing for creating and reproducing the scenario movie image.

First, if the user performs an instruction (for example, pressing the menu button) to display a movie image reproduction menu, a movie image reproduction menu screen is displayed on the display unit 20 by the control unit 4 (step S60). Items that allow for selecting various movie image reproduction modes (for example, scenario movie image reproduction modes A, B, C, D, and E) are displayed on the movie image reproduction menu screen. If the user selects one movie image reproduction mode (in this embodiment, this is the scenario movie image reproduction mode A), using the cross key or the like, and presses the OK button, the control unit 4 moves to the scenario movie image reproduction mode A. It is to be noted that in this embodiment, the scenario movie image reproduction mode A is a mode wherein a scenario movie image in which a continuously moving subject is reproduced as moving discontinuously (hereafter, referred to simply as a scenario movie) is created and reproduced. Furthermore, the movie image reproduction modes includes not only the mode for creating and reproducing the above-described scenario movie image, but also movie image reproduction modes (other scenario movie image reproduction modes B to E) in which the movie image is reproduced and displayed according to scenarios different from each other in each mode and which provide various video effects, e.g., a mode in which a movie image is created and reproduced so that a stationary image is displayed as being moving, or a moving subject is displayed as being stationary.

Next, when the control unit 4 moves to the scenario movie image reproduction mode A, in order for the user to select a movie image file containing a movie image for creating the scenario movie, which is to say, one of the movie image files that are recorded on the recording medium 18, the control unit 4 displays a movie image selection screen on the display unit 20 (step S61). Specifically, the control unit 4 displays a list of movie image files that are recorded on the recording medium 18, such as, for example, a list of filenames or a list of thumbnail images of representative frame images, on the display unit 20, and allows the user to select one of the movie image files using the cross key or the like. It is to be noted that in this embodiment, a description is given of a case in which the user selects a movie image file of a movie image in which a train approaches the electronic camera 2 from a distance, as shown in FIG. 8.

Figure 17:
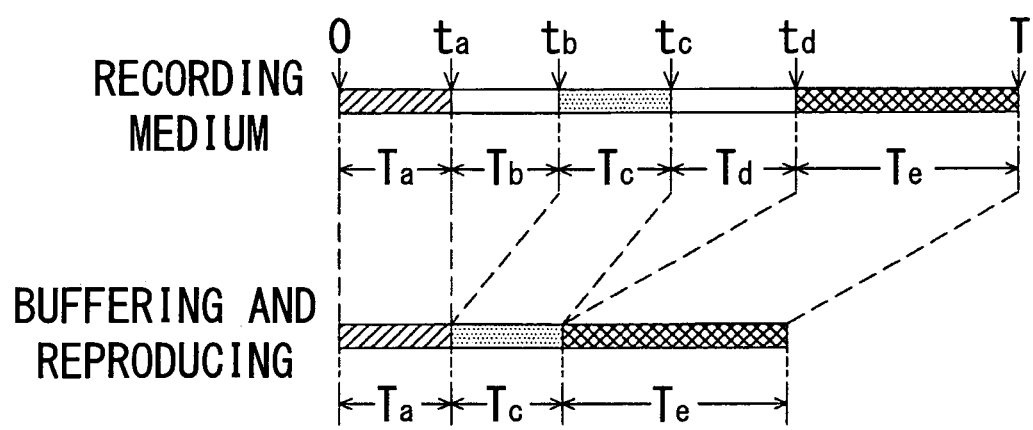
FIG. 17 is a diagram explaining processing when creating and reproducing a scenario movie image in an electronic camera according to the fourth embodiment.

When the user selects one movie image file, using the cross key or the like, and presses the OK button, the control unit 4 starts buffering the movie image data in the movie image file selected in step S61 (referred to as the original movie image data) to the movie-image buffer memory 12, and buffering the audio data in the movie image file selected in step S61 (referred to as the original audio data) to the audio buffer memory 16 (step S62). That is, as shown in FIG. 17, image data for a zone movie image formed from at least one frame image in a period from time 0 to time to (reproducing time Ta) in the movie image having a reproducing time T, which is based upon the original movie image data (hereafter, referred to as the original movie image), is stored in the movie-image buffer memory 12 and audio data for the zone audio in the period from time 0 to time ta (reproducing time Ta) in the audio having the reproducing time T, which is based upon the original audio data (hereafter, referred to as the original audio), is stored in the audio buffer memory 16. It is to be noted that reproducing times Ta and Tc, in which the zone movie images are reproduced by way of the display unit 20 and the speaker 22, are set in advance and stored in a memory (not shown) or the like.

While the zone movie image and zone audio data for the period from the time 0 to ta are buffered, the control unit 4 detects the movement velocity of the subject in the zone movie image for the period from the time 0 to ta (step S63). Specifically, the control unit 4 resizes at least two frame images from among a plurality of frame images that form the zone movie image for the period from the time 0 to ta, based upon the original movie image data, to a resolution for use in movement information detection, and outputs this to the movement information detection unit 25. The movement information detection unit 25 detects movement information of the subject (in FIG. 8, the train) using well known motion vector calculation processing, based upon the at least two resized frame images (for example, frame images 30 and 32 shown in FIG. 8), and outputs the detection result to the control unit 4. The control unit 4 detects the movement velocity of the subject based upon the movement information of the subject (train) detected by the movement information detection unit 25.

Next, the control unit 4 sets the length of a non-reproducing time Tb (the period from the time ta to tb) in which a zone movie image formed from at least one frame image from the original movie image and the zone audio from the original audio, subsequent to the reproducing time Ta, will not be reproduced byway of the display unit 20 and the speaker 22 (step S64). Specifically, in response to an increase in the movement velocity of the subject (train) detected in step S63, which is to say, with acceleration of the train, the control unit 4 sets the non-display time Tb shorter, and in response to a decrease in the movement velocity of the train, which is to say, with deceleration of the train, sets the non-display time Tb longer.

Then, after buffering corresponding to the reproducing time Ta (the period from the time 0 to ta) (step S65), the size of the subject (train) with respect to the overall size of the frame image is detected by the control unit 4, without buffering either the image data for the zone movie image or the audio data for the zone audio corresponding to the non-reproducing time Tb (the period from time ta to tb) that is set in step S64 (step S66). Specifically, at least one frame image from the plurality of frame images that form the zone movie image in the period from time 0 to tb (for example, frame images 32 and 34 shown in FIG. 8) is resized to a resolution for use in size information detection to output to the size information detection unit 26. The size information detection unit 26 identifies the train in the frame images 32 and 34, based upon a template (train template) stored in advance in a memory (not shown) or the like, calculates the number of pixels occupied by the train with respect to the number of pixels in the overall frame image, for example, detects the size of the train with respect to the overall frame image based upon the calculation result, and outputs the detection result to the control unit 4.

Next, the control unit 4 determines whether or not the size of the train with respect to the overall frame image that is detected in step S66 is greater than or equal to a predetermined value (step S67). The predetermined value is set in advance as, for example, a ratio representing the subject with respect to the overall frame image (the area of the subject, or the length in the longitudinal, crosswise or diagonal direction of the overall frame image) being greater than or equal to 50% or the like, and is stored in a memory (not shown) or the like. If it is determined in step S67 that the size of the train with respect to the overall frame image is not greater than or equal to the predetermined value (No in step S67), the control unit 4 returns to the processing in step S62, and repeats the processing in steps S62 to S64.

That is, the image data for the zone movie image for the period from the time tb to tc in the original movie image (reproducing time Tc) is stored in the movie-image buffer memory 12 and the audio data for the zone audio for the period from the time tb to tc in the original audio (reproducing time Tc) is stored in the audio buffer memory 16, while the movement velocity of the subject is detected based upon at least two frame images (for example, frame images 34 and 36 shown in FIG. 8) from the zone movie image for the period from the time tb to tc. Then, the length of the non-reproducing time Td (the period from the time tc to td) is set based upon the detection result, and after buffering corresponding to the reproducing time Tc (the period from the time tb to tc) has ended, the size of the subject (train) with respect to the overall frame image is detected from at least one frame image in the zone movie image for the period from the time tb to td (for example, frame images 36 and 38 shown in FIG. 8) without buffering the image data for the zone movie image and the audio data for the zone audio corresponding to the non-reproducing time Td (the period from the time tc to td).

Meanwhile, if it is determined in step S67 that the size of the train with respect to the overall frame image is greater than or equal to the predetermined value (Yes in step S67), the control unit 4 sets the non-reproducing time to 0 (step S68). Then, as shown in FIG. 17, the image data for the zone movie image subsequent to the time td in the original movie image (reproducing time Te) is buffered to the movie-image buffer memory 12 and the audio data for the zone audio subsequent to the time td in the original audio (reproducing time Te) is buffered to the audio buffer memory 16 (step S69). It is to be noted that during the processing in steps S62 to S69, a display may be performed that indicates to the user that the scenario movie image is being created, such as displaying an hourglass image or the like on the display unit 20.

Next, the control unit 4 successively reads out the movie image data and the audio data that have been buffered to the movie-image buffer memory 12 and the audio buffer memory 16, respectively, so as to reproduce the scenario movie image (step S70). That is, as shown in FIG. 17, first, the zone movie image and the zone audio for the period from the time 0 to ta (reproducing time Ta), and then the zone movie image and the zone audio for the period from the time tb to tc (reproducing time Tc), and lastly the zone movie image and the zone audio subsequent to the time td (reproducing time Te) are reproduced by way of the display unit 20 and the speaker 22.

Next, the control unit 4 displays a screen on the display unit 20 for selecting whether or not to reproduce the scenario movie image that is reproduced in step S70 once again, and if the user selects "Reproduce Again" using the cross key or the like and presses the OK button (Yes in step S71), the control unit 4 returns to the processing in step S70. Meanwhile, if the user selects "End" or the like (No in step S71), the control unit 4 ends reproduction of the scenario movie image according to the present embodiment.

It is to be noted that this scenario movie image that is reproduced in step S70, which is to say, the movie image data and the audio data that are stored in the movie-image buffer memory 12 and the audio buffer memory 16, respectively, can also be recorded on the recording medium 18 as a single movie image file for this scenario movie image. In this case, for example, after reproducing the scenario movie image, the control unit 4 displays a selection screen on the display unit 20 for selecting whether or not to record the scenario movie image that is reproduced on the recording medium 18, and if the user indicates that this is to be recorded, it is recorded.

With the electronic camera 2 according to the fourth embodiment, it is possible to easily create and reproduce a scenario movie image in which the reproduction and non-reproduction of zone movie images from the movie image file recorded on the recording medium 18 are automatically repeated, which is to say, a scenario movie image having an impressive video effect in which a continuously moving subject is reproduced as moving discontinuously. That is, based upon a movie image of a train or the like that approaches the electronic camera 2 from a distance, it is possible to easily create and reproduce a scenario movie image in which the train approaches more powerfully (with the sensation of speed). Further, the final zone movie image and zone audio are continuously reproduced during the reproducing time Te, which is longer than the reproducing times Ta and Tc, whereby it is possible to create and reproduce scenario movie image that does not suddenly end, does not produce an unnatural feeling in the spectator, and leaves a strong impression in the final scene.

It is to be noted that in the fourth embodiment, the non-reproducing time is set based upon the movement velocity of the subject, but it is also possible to set the reproducing time based upon the movement velocity of the subject. In this case, the control unit 4 sets the lengths of reproducing times in advance for movement velocities of the subject, stores these in a table in a memory (not shown) or the like, and sets the lengths of the reproducing time by way of referencing this table. Specifically, the reproducing time is shortened with greater subject movement velocities. That is, with a rapidly moving subject, even if the reproducing time is short, the manner in which the subject is moving can be reproduced, and by shortening the reproducing time, the number of times that switches are made between reproduction and non-reproduction can be increased, and thus the characteristic video effect of the scenario movie image can be adequately expressed. Meanwhile, the reproducing time is lengthened with lower subject movement velocities. That is, with a slowly moving subject, the number of times that switches are made between reproduction and non-reproduction decreases as a result of lengthening the reproducing time, but because it is possible to clearly reproduce the manner in which the subject is moving, the characteristic video effect of, the scenario movie image can be adequately expressed.

Further, it is also possible to set both the reproducing time and the non-reproducing time based upon the movement velocity of the subject. In this case, the reproducing time and the non-reproducing time are shortened with greater subject movement velocities. That is, by switching between reproduction and non-reproduction at a rapid rate, the characteristic video effect of the scenario movie image is expressed. Meanwhile, the reproducing time and the non-reproducing times are lengthened with lower subject movement velocities. That is, by switching between reproduction and non-reproduction at a moderate rate, the characteristic video effect of the scenario movie image is expressed.

Further, if the scenario movie image is created from a movie image in which a subject is shot moving towards the electronic camera 2 from a distance, or moving from the vicinity of the electronic camera 2 to a distance therefrom, instead of the movement velocity of the subject, it is also possible to set at least one of the reproducing time and the non-reproducing time based upon the size of the subject with respect to the overall frame image. In this case, the size of the subject with respect to the shooting screen is detected by the size information detection unit 26, the control unit 4 shortens at least one of the reproducing time and the non-reproducing time in response to an increase in the extent to which the detected size of the subject increases or decreases with respect to the shooting screen, and lengthens at least one of the reproducing time and the non-reproducing time in response to a decrease in the extent to which size of the subject increases or decreases with respect to the shooting screen.

Further, if a scenario movie image is created from a movie image in which a subject is shot moving towards the electronic camera 2 from a distance or moving from the vicinity of the electronic camera 2 to a distance therefrom, instead of the movement velocity of the subject, it is also possible to set at least one of the reproducing time and the non-reproducing time based upon focal length information for a photographic lens (not shown) that guides light from the subject to the imaging sensor 6. In this case, the control unit 4 obtains focal length information for the photographic lens and shooting time information, which are added to the original movie image file as shooting information. Then, the rate of change in the focal length of the photographic lens is detected based upon the obtained focal length information for the photographic lens and shooting time information. Then, at least one of the reproducing time and the non-reproducing time is shortened in response to an increase in the extent at which the focal length of the photographic lens decreases or increases, and at least one of the reproducing time and the non-reproducing time is lengthened in response to a decrease in the extent at which the focal length of the photographic lens shortens or lengthens.

Further, when a movie image is shot with the electronic camera 2 and that movie image data is recorded on the recording medium 18, velocity information of the subject and shooting time information may be added as shooting information and recorded on the recording medium 18, and at least one of the reproducing time and non-reproducing time may be set based upon the recorded velocity information and shooting time information. If a scenario movie image is created from a movie image in which a subject is shot moving towards the electronic camera 2 from a distance, or moving from the vicinity of the electronic camera 2 to a distance therefrom, velocity information of the subject that is added as shooting information when shooting the movie image with the electric camera 2 is calculated based upon the distance to the subject, which is obtained, for example, from the movement information of the subject that is detected by an autofocus function, which is based upon a divided-pupil phase difference detection system, with which the electronic camera 2 is provided, and on the time.

Further, the constitution may be such that both the reproducing time and the non-reproducing time are set in advance. In this case, a scenario movie image can easily be shot, which is similar to the scenario movie image that is created and reproduced in the fourth embodiment, even if the movement information detection unit 25 and the size information detection unit 26 are not provided.

It is to be noted that in the fourth embodiment, the non-reproducing time is set to 0 based upon the detection result from the size information detection unit 26, but it is also possible to set the number of times for reproduction and non-reproduction (predetermined number of times) in advance and, instead of the processing in steps S66 and S67 shown in FIG. 16, determine whether or not the zone movie images and the zone audios have been buffered for a time corresponding to the reproducing time for the predetermined number of times, and set the non-reproducing time to 0 based upon the determination result. Specifically, the predetermined number of times is set in advance and stored in a memory (not shown) or the like. For example, the predetermined number of times is set to twice. In this case, if it has been determined that the zone movie images and zone audios have not been buffered twice (have only been buffered once), the control unit 4 returns to the processing in step S62 shown in FIG. 16, and repeats the processing in steps S62 to S65 until it is determined that the zone movie images and zone audios have been buffered twice. Then, if it is determined that the zone movie images and the zone audios have been buffered twice, the processing in steps S68 to S71 shown in FIG. 16 is performed. In this case, because the number of times for reproduction and non-reproduction of the zone movie image and the zone audio is set in advance, it is easily possible to shoot a scenario movie image similar to the scenario movie image that is created and reproduced in the fourth embodiment, even if the size information detection unit 26 is not provided.

Further, the constitution may also be such that at least one of the reproducing time, the non-reproducing time and the predetermined number of times is set in advance, at least one of the reproducing time, the non-reproducing time and the predetermined number of times that has been set in advance is treated as a default, and at least one of the reproducing time, the non-reproducing time and the predetermined number of times can be changed. In this case, an item for setting at least one of the reproducing time, the non-reproducing time and the predetermined number of times is added to the menu items in the menu, and before the scenario movie image is created, the menu screen is displayed on the display unit 20, and at least one of the reproducing time, the non-reproducing time and the predetermined number of times is set by way of operations using the cross key or the like.

Further, a settings screen for setting the reproducing time, the non-reproducing time and the predetermined number of times may be displayed on the display unit 20 after the original movie image file has been selected. When the user sets the reproducing time, the non-reproducing time and the predetermined number of times on the settings screen, using the cross key or the like, and presses the OK button, the control unit 4 starts creating the scenario movie image.

It is to be noted that the constitution may also be such that instead of using the cross key and the OK button, the electric camera 2 includes: a touch panel I/F; and a touch panel connected to the touch panel I/F and provided on the display screen of the display unit 20, and the reproducing time, the non-reproducing time, and the predetermined number of times are set on the settings screen, using this touch panel. In this case, the control unit 4 performs recognition via the touch panel I/F as a result of the touch panel (display screen of the display unit 20) being touched, for example, by the user's finger, a pen or the like, and performs processing based upon the recognition results.

Further, the constitution may be such that, instead of setting the number of times that reproduction and non-reproduction are performed for the zone movie images and the zone audios, a predetermined time in which reproduction and non-reproduction of the zone movie images and the zone audios are performed (>the total reproducing time T of the original movie image) is set in advance. In this case, instead of the control unit 4 determining whether or not the reproduction and the non-reproduction of the zone movie image and the zone audio are performed the predetermined number of times, the control unit 4 determines whether or not the reproduction and the non-reproduction of the zone movie image and the zone audio are performed for the predetermined time.

It is to be noted that if at least one of the reproducing time, the non-reproducing time and the predetermined number of times (predetermined time) is set manually as described above, the constitution may be such that control is performed so that the user cannot set times or number of times outside an allowed setting range (for example, if the predetermined time exceeds the total reproducing time T of the original movie image or the like).

Further, in the fourth embodiment, the constitution is not such that setting is performed for the reproducing time Te, in which the final zone movie image and zone audio shown in FIG. 17 are reproduced (a time that is longer than the reproducing times Ta and Tc), but the constitution may be such that the reproducing time Te can be set in advance. In this case, the buffering of the zone movie images and the zone audios corresponding to the reproducing time is repeated in the time period resulting from subtracting the reproducing time Te from the overall reproducing time T of the original movie image (in FIG. 17, from the time 0 to the time td), and lastly, buffering of a zone movie image and a zone audio corresponding to the reproducing time Te is performed.

Further, in the fourth embodiment, as shown in FIG. 17, after repeating buffering of the zone movie images and the zone audios corresponding to the reproducing time a predetermined number of times, the final zone movie image and zone audio are buffered for a time that is longer than the reproducing time (in FIG. 17, the time Te, which is longer than the reproducing times Ta and Tc), but buffering of the zone movie images and the zone audios corresponding to the reproducing time can be repeated until the original movie image ends. Further, after buffering the initial zone movie image and zone audio for a time that is longer than the reproducing time, buffering of the zone movie images and zone audios corresponding to the reproducing time can be repeated.

Further, in the fourth embodiment, audio data for the zone audio corresponding to the zone movie image is buffered and the zone movie image is reproduced together with the corresponding zone audio, but the movie image data for the zone movie image alone may be buffered without buffering the audio data for the zone audio, and the zone movie image alone may be reproduced. Alternatively, the movie image data for the zone movie image alone may be buffered, without buffering the audio data for the zone audio, and arbitrary music or audio (music or audio that has been stored in a memory (not shown) within the electronic camera 2 in advance, which is selected by the user or automatic selection by the control unit 4) may be reproduced together with the zone movie image. In this case, it is not necessary for this to be discontinuous music (or audio) matching the discontinuous movie image in which the plurality zone movie images have been joined, but rather it is preferable that uninterrupted music (continuous music) be reproduced. In addition, if the music (or audio) suddenly ends just before the end of reproducing the scenario move image, an unnatural impression will be produced, and it is preferable to reproduce the music (or audio) so that it fades out, matching the end of reproducing the scenario movie image. Further, in some cases, it is preferable to reproduce the music (or audio) so that it fades in, matching the start of reproducing the scenario movie image.

Further, in the fourth embodiment, a scenario movie image is created from a movie image of a train approaching the electronic camera 2 from a distance as shown in FIG. 8, but a scenario movie image can also be created from, for example, as shown in FIG. 10, a movie image of a subject (person) moving crosswise with respect to the shooting screen.

Further, in the fourth embodiment, a scenario movie image is created and reproduced corresponding to from the beginning to the end (the entirety) of the original movie image, but a scenario movie image may be created and reproduced corresponding to a portion of the original movie image. The portion of the original movie image for which a scenario movie image is created may, for example, be specified by way of a user operation. Alternatively, the constitution may be such that a scenario movie image is created and reproduced only for a portion of the original movie image in which the subject is moving.

Further, in the fourth embodiment, description is given using the example of an electronic camera 2 as the image processing device, but the present invention is not limited to electronic cameras, and can also be applied to other image processing devices, such as personal computers, which are capable of performing image processing on movie images shot by an imaging device or the like. Further, in the third embodiment, a scenario movie image is created and reproduced using a movie image that is shot with the electronic camera 2 and recorded on the recording medium 18, but a scenario movie image can also be created and reproduced by the electronic camera 2 using a movie image that has been shot by another imaging device or the like and recorded on a recording medium.

The embodiments explained above have been described so that the present invention is understood more easily, and are not intended to limit the present invention. Therefore, in this meaning, the respective elements, which are disclosed in the respective embodiments described above, also include all of modifications of design and equivalents belonging to the technical scope of the present invention.

The invention claimed is:

1. An imaging device, comprising:
an imaging sensor that captures light from a subject;
a movement information detection unit that detects movement information of the subject;
a time setting unit that sets at least one of a recording time for recording a zone movie image based upon an imaging signal from the imaging sensor and a recording pause time for not recording the zone movie image, based on the movement information of the subject detected by the movement information detection unit; and
a movie image data creation unit that repeats recording of the zone movie image for the recording time and pausing of the recording of the zone movie image for the recording pause time based upon the setting made by the time setting unit, and creates movie image data including a movie image formed by successively joining a plurality of the repeatedly recorded zone movie images;
a size detection unit that detects a size of the subject with respect to a shooting screen, wherein
the time setting unit sets the recording pause time to 0, if the size of the subject with respect to the shooting screen that is detected by the size detection unit is greater than or equal to a predetermined value.

2. The imaging device according to claim 1, wherein the time setting unit shortens the recording time in response to an increase in a movement velocity of the subject, and lengthens the recording time in response to a decrease in the movement velocity of the subject, based upon the movement information of the subject.

3. The imaging device according to claim 1, wherein the time setting unit shortens the recording pause time in response to an increase in a movement velocity of the subject, and lengthens the recording pause time in response to a decrease in the movement velocity of the subject, based upon the movement information of the subject.

4. The imaging device according to claim 1, wherein
the movement information detection unit detects a size of the subject with respect to a shooting screen, as the movement information of the subject, and
the time setting unit sets at least one of the recording time and the recording pause time, based upon the size of the subject with respect to the shooting screen that is detected by the movement information detection unit.

5. The imaging device according to claim 1, comprising
a focal length information obtaining unit that obtains, in a predetermined time interval, focal length information for a photographic lens that guides light from the subject to the imaging sensor, while the movie image is being shot, wherein
the movement information detection unit detects the movement information of the subject based upon the focal length information that is obtained by the focal length information obtaining unit.

6. The imaging device according to claim 1, comprising:
a movie image storage unit that stores a movie image based upon the imaging signal from the imaging sensor; and
a movement information recording unit that records movement information of the subject detected by the movement information detection unit, wherein
the time setting unit sets at least one of the recording time and the recording pause time, based upon the movement information that has been recorded in the recording unit, and
the movie image data creation unit creates the movie image data, based upon a setting made by the time setting unit and the movie image that has been stored in the movie image storage unit.

7. The imaging device according to claim 1, comprising
a display unit that displays a movie image, wherein
the movement information detection unit detects movement information for a principal subject in a predetermined movie image based upon predetermined movie image data that has been recorded on a recording medium,
the time setting unit sets at least one of a display time in which a predetermined zone movie image, formed from at least one frame image from among a plurality of frame images that form the predetermined movie image, is displayed on the display unit, and a non-display time in which the predetermined zone movie image is not displayed on the display unit, based upon the movement information for the principal subject detected by the movement information detection unit, and
the display unit joins and displays a plurality of the predetermined zone movie images corresponding to the display time, in the temporal sequence in which the predetermined zone movie images are recorded, based upon a setting made by the time setting unit.

8. An imaging device, comprising:
an imaging sensor that captures light from a subject;
a movement information detection unit that detects movement information of the subject;
a time setting unit that sets at least one of a recording time for recording a zone movie image based upon an imaging signal from the imaging sensor and a recording pause time for not recording the zone movie image, based on the movement information of the subject detected by the movement information detection unit; and
a movie image data creation unit that repeats recording of the zone movie image for the recording time and pausing of the recording of the zone movie image for the recording pause time based upon the setting made by the time setting unit, and creates movie image data including a movie image formed by successively joining a plurality of the repeatedly recorded zone movie images;
a number of times setting unit that sets the number of times that recording of the zone movie image and pausing of the recording are repeated, wherein
the time setting unit sets the recording pause time to 0, in a period subsequent to the elapse of a number of the recording times and the recording pause times corresponding to the number of times set by the number of times setting unit, and up to the end of recording of the movie image based upon the movie image data created by the movie image data creation unit, or in a period from the start of recording of the movie image, and up to the start of the first recording time and recording pause time.

9. The imaging device according to claim 8, wherein the time setting unit shortens the recording time in response to an increase in a movement velocity of the subject, and lengthens the recording time in response to a decrease in the movement velocity of the subject, based upon the movement information of the subject.

10. The imaging device according to claim 8, wherein the time setting unit shortens the recording pause time in response to an increase in a movement velocity of the subject, and lengthens the recording pause time in response to a decrease in the movement velocity of the subject, based upon the movement information of the subject.

11. The imaging device according to claim 8, wherein
the movement information detection unit detects a size of the subject with respect to a shooting screen, as the movement information of the subject, and
the time setting unit sets at least one of the recording time and the recording pause time, based upon the size of the subject with respect to the shooting screen that is detected by the movement information detection unit.

12. The imaging device according to claim 8, comprising
a focal length information obtaining unit that obtains, in a predetermined time interval, focal length information for a photographic lens that guides light from the subject to the imaging sensor, while the movie image is being shot, wherein
the movement information detection unit detects the movement information of the subject based upon the focal length information that is obtained by the focal length information obtaining unit.

13. The imaging device according to claim 8, comprising:
a movie image storage unit that stores a movie image based upon the imaging signal from the imaging sensor; and
a movement information recording unit that records movement information of the subject detected by the movement information detection unit, wherein
the time setting unit sets at least one of the recording time and the recording pause time, based upon the movement information that has been recorded in the recording unit, and
the movie image data creation unit creates the movie image data, based upon a setting made by the time setting unit and the movie image that has been stored in the movie image storage unit.

14. The imaging device according to claim 8, comprising
a display unit that displays a movie image, wherein
the movement information detection unit detects movement information for a principal subject in a predetermined movie image based upon predetermined movie image data that has been recorded on a recording medium,
the time setting unit sets at least one of a display time in which a predetermined zone movie image, formed from at least one frame image from among a plurality of frame images that form the predetermined movie image, is displayed on the display unit, and a non-display time in which the predetermined zone movie image is not displayed on the display unit, based upon the movement information for the principal subject detected by the movement information detection unit, and
the display unit joins and displays a plurality of the predetermined zone movie images corresponding to the display time, in the temporal sequence in which the predetermined zone movie images are recorded, based upon a setting made by the time setting unit.

15. An imaging device, comprising:
an imaging sensor that captures light from a subject;
a movement information detection unit that detects movement information of the subject;
a time setting unit that sets at least one of a recording time for recording a zone movie image based upon an imaging signal from the imaging sensor and a recording pause time for not recording the zone movie image, based on the movement information of the subject detected by the movement information detection unit; and
a movie image data creation unit that repeats recording of the zone movie image for the recording time and pausing of the recording of the zone movie image for the recording pause time based upon the setting made by the time setting unit, and creates movie image data including a movie image formed by successively joining a plurality of the repeatedly recorded zone movie images, wherein
the time setting unit sets the recording pause time to 0, in a period subsequent to the elapse of a first predetermined time, which is a time in which the recording of the zone movie image and the pausing of recording are repeated, and which is set in advance, and up to the end of the recording of the movie image based upon the movie image data created by the movie image data creation unit, or in a period from the start of recording of the movie image, and up to the elapsing of a second predetermined time which is set in advance.

16. The imaging device according to claim 15, wherein the time setting unit shortens the recording time in response to an increase in a movement velocity of the subject, and lengthens the recording time in response to a decrease in the movement velocity of the subject, based upon the movement information of the subject.

17. The imaging device according to claim 15, wherein the time setting unit shortens the recording pause time in response to an increase in a movement velocity of the subject, and lengthens the recording pause time in response to a decrease in the movement velocity of the subject, based upon the movement information of the subject.

18. The imaging device according to claim 15, wherein
the movement information detection unit detects a size of the subject with respect to a shooting screen, as the movement information of the subject, and
the time setting unit sets at least one of the recording time and the recording pause time, based upon the size of the subject with respect to the shooting screen that is detected by the movement information detection unit.

19. The imaging device according to claim 15, comprising
a focal length information obtaining unit that obtains, in a predetermined time interval, focal length information for a photographic lens that guides light from the subject to the imaging sensor, while the movie image is being shot, wherein
the movement information detection unit detects the movement information of the subject based upon the focal length in formation that is obtained by the focal length information obtaining unit.

20. The imaging device according to claim 15, comprising:
a movie image storage unit that stores a movie image based upon the imaging signal from the imaging sensor; and a movement information recording unit that records movement information of the subject detected by the movement information detection unit, wherein the time setting unit sets at least one of the recording time and the recording pause time, based upon the movement information that has been recorded in the recording unit, and the movie image data creation unit creates the movie image data, based upon a setting made by the time setting unit and the movie image that has been stored in the movie image storage unit.

21. The imaging device according to claim 15, comprising a display unit that displays a movie image, wherein the movement information detection unit detects movement information for a principal subject in a predetermined movie image based upon predetermined movie image data that has been recorded on a recording medium, the time setting unit sets at least one of a display time in which a predetermined zone movie image, formed from at least one frame image from among a plurality of frame images that form the predetermined movie image, is displayed on the display unit, and a non-display time in which the predetermined zone movie image is not displayed on the display unit, based upon the movement information for the principal subject detected by the movement information detection unit, and the display unit joins and displays a plurality of the predetermined zone movie images corresponding to the display time, in the temporal sequence in which the predetermined zone movie images are recorded, based upon a setting made by the time setting unit.

22. An image processing device, comprising:

a movement information detection unit that detects movement information for a subject in a movie image based upon movie image data recorded on a recording medium;

a time setting unit that sets at least one of a display time in which a zone movie image, formed from at least one frame image from among a plurality of frame images that form the movie image, is displayed on a display unit, and a non-display time in which the zone movie image is not displayed on the display unit, based upon the movement information of the subject detected by the movement information detection unit; and a display control unit that joins and displays on the display unit a plurality of the zone movie images corresponding to the display time, in the temporal sequence in which the zone movie images are recorded, based upon a setting made by the time setting unit;

a size detection unit that detects a size of the subject with respect to the frame image, wherein the time setting unit sets the non-display time to 0, if the size of the subject with respect to the frame image detected by the size detection unit is greater than or equal to a predetermined value.

23. The image processing device according to claim 22, wherein the time setting unit shortens the display time in response to an increase in a movement velocity of the subject, and lengthens the display time in response to a decrease in the movement velocity of the subject, based upon the movement information of the subject.

24. The image processing device according to claim 22, wherein the time setting unit shortens the non-display time in response to an increase in a movement velocity of the subject, and lengthens the non-display time in response to a decrease in the movement velocity of the subject, based upon the movement information of the subject.

25. The image processing device according to claim 22, wherein the movement information detection unit detects a size of the subject with respect to the frame image, as the movement information of the subject; and the time setting unit sets at least one of the display time and the non-display time, based upon the size of the subject with respect to the frame image that is detected by the movement information detection unit.

26. The image processing device according to claim 22, wherein the movement information detection unit detects the movement information of the subject based upon focal length information for a photographic lens and the recording times at which the plurality of frame images are recorded, which have been added to the movie image data as shooting information.

27. An image processing device, comprising:

a movement information detection unit that detects movement information for a subject in a movie image based upon movie image data recorded on a recording medium;

a time setting unit that sets at least one of a display time in which a zone movie image, formed from at least one frame image from among a plurality of frame images that form the movie image, is displayed on a display unit, and a non-display time in which the zone movie image is not displayed on the display unit, based upon the movement information of the subject detected by the movement information detection unit; and a display control unit that joins and displays on the display unit a plurality of the zone movie images corresponding to the display time, in the temporal sequence in which the zone movie images are recorded, based upon a setting made by the time setting unit;

a number of times setting unit that sets the number of times that display of the zone movie image and non-display are repeated, wherein the time setting unit sets the non-display time to 0, in a period subsequent to the elapse of a number of the display times and the non-display times corresponding to the number of times set by the number of times setting unit, and up to the end of the movie image, or in a period from the start of the movie image, and up to the start of the first display time and non-display time.

28. The image processing device according to claim 27, wherein the time setting unit shortens the display time in response to an increase in a movement velocity of the subject, and lengthens the display time in response to a decrease in the movement velocity of the subject, based upon the movement information of the subject.

29. The image processing device according to claim 27, wherein the time setting unit shortens the non-display time in response to an increase in a movement velocity of the subject, and lengthens the non-display time in response to a decrease in the movement velocity of the subject, based upon the movement information of the subject.

30. The image processing device according to claim 27, wherein the movement information detection unit detects a size of the subject with respect to the frame image, as the movement information of the subject; and the time setting unit sets at least one of the display time and the non-display time, based upon the size of the subject with respect to the frame image that is detected by the movement information detection unit.

31. The image processing device according to claim 27, wherein the movement information detection unit detects the movement information of the subject based upon focal length information for a photographic lens and the recording times at which the plurality of frame images are recorded, which have been added to the movie image data as shooting information.

32. An image processing device, comprising:
- a movement information detection unit that detects movement information for a subject in a movie image based upon movie image data recorded on a recording medium;
- a time setting unit that sets at least one of a display time in which a zone movie image, formed from at least one frame image from among a plurality of frame images that form the movie image, is displayed on a display unit, and a non-display time in which the zone movie image is not displayed on the display unit, based upon the movement information of the subject detected by the movement information detection unit; and
- a display control unit that joins and displays on the display unit a plurality of the zone movie images corresponding to the display time, in the temporal sequence in which the zone movie images are recorded, based upon a setting made by the time setting unit, wherein
- the time setting unit sets the non-display time to 0, in a period subsequent to the elapse of a first predetermined time, which is a time in which display of the zone movie image and non-display are repeated, and which is set in advance, and up to the end of the movie image, or in a period from the start of the movie image, and up to the elapsing of a second predetermined time which is set in advance.

33. The image processing device according to claim 32, wherein the time setting unit shortens the display time in response to an increase in a movement velocity of the subject, and lengthens the display time in response to a decrease in the movement velocity of the subject, based upon the movement information of the subject.

34. The image processing device according to claim 32, wherein the time setting unit shortens the non-display time in response to an increase in a movement velocity of the subject, and lengthens the non-display time in response to a decrease in the movement velocity of the subject, based upon the movement information of the subject.

35. The imaging device according to claim 32, wherein
the movement information detection unit detects a size of the subject with respect to the frame image, as the movement information of the subject; and
the time setting unit sets at least one of the display time and the non-display time, based upon the size of the subject with respect to the frame image that is detected by the movement information detection unit.

36. The image processing device according to claim 32, wherein the movement information detection unit detects the movement information of the subject based upon focal length information for a photographic lens and the recording times at which the plurality of frame images are recorded, which have been added to the movie image data as shooting information.

* * * * *